INVENTORS
EDWARD D. PIERSON
JAMES C. WRIGHT

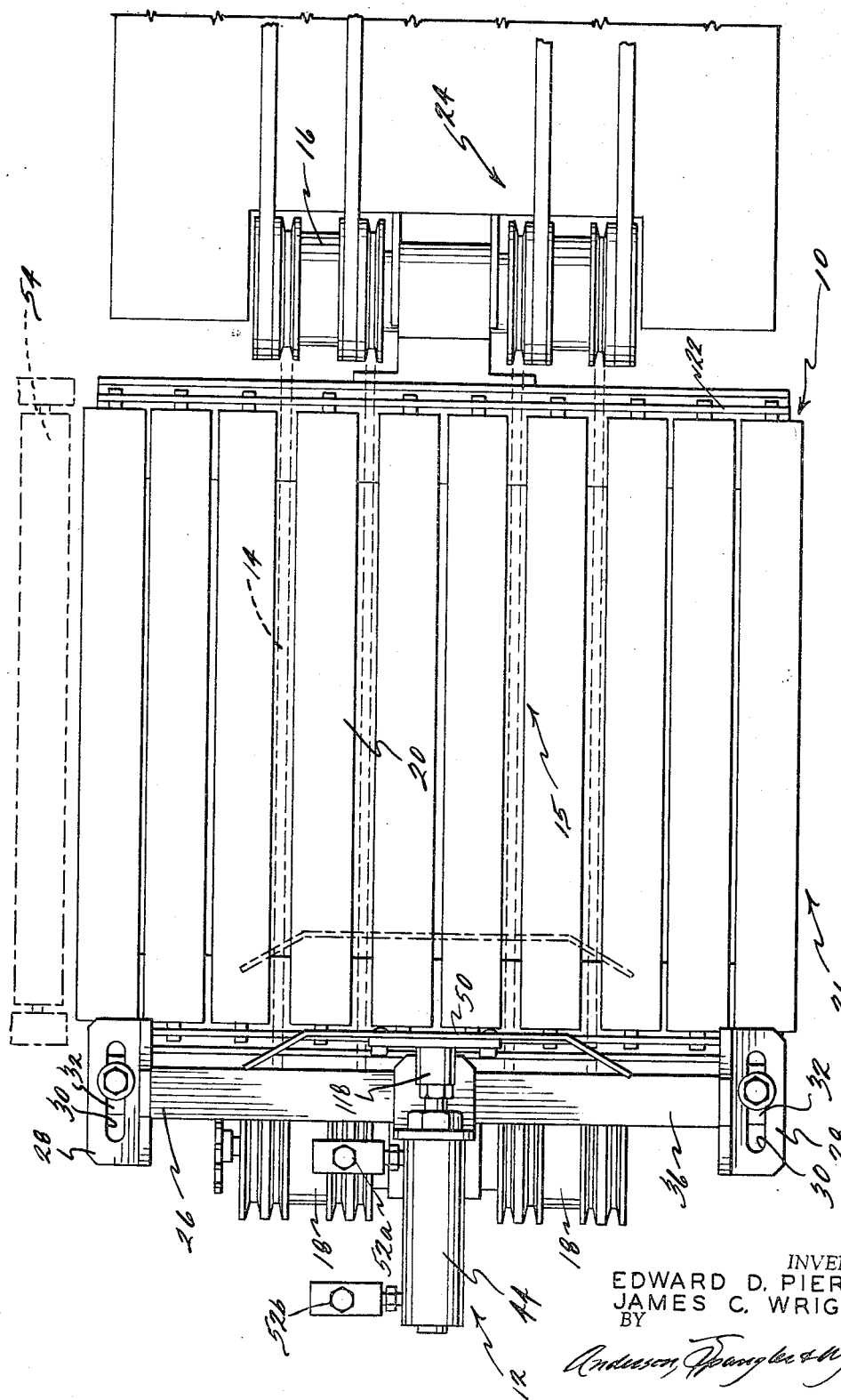

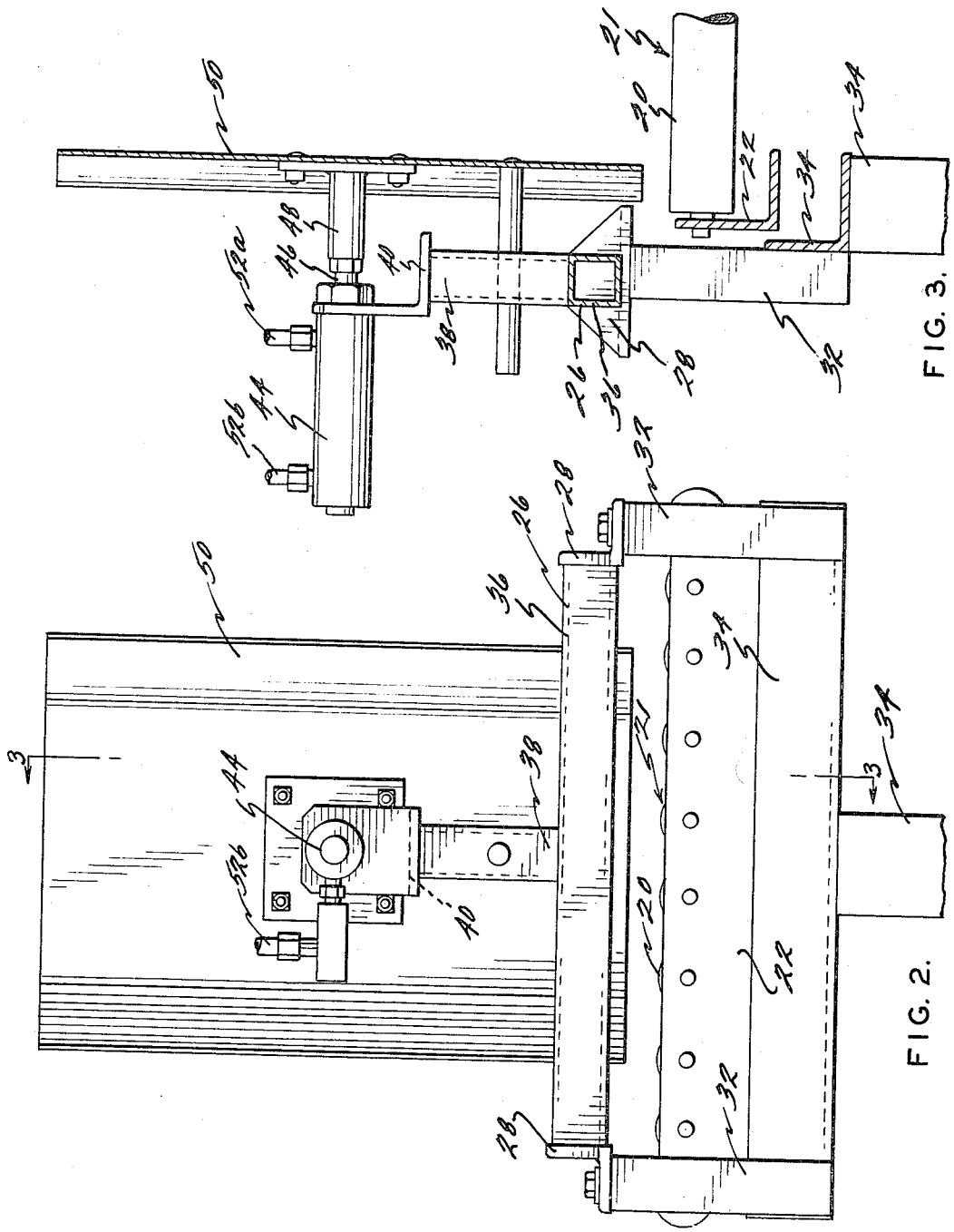

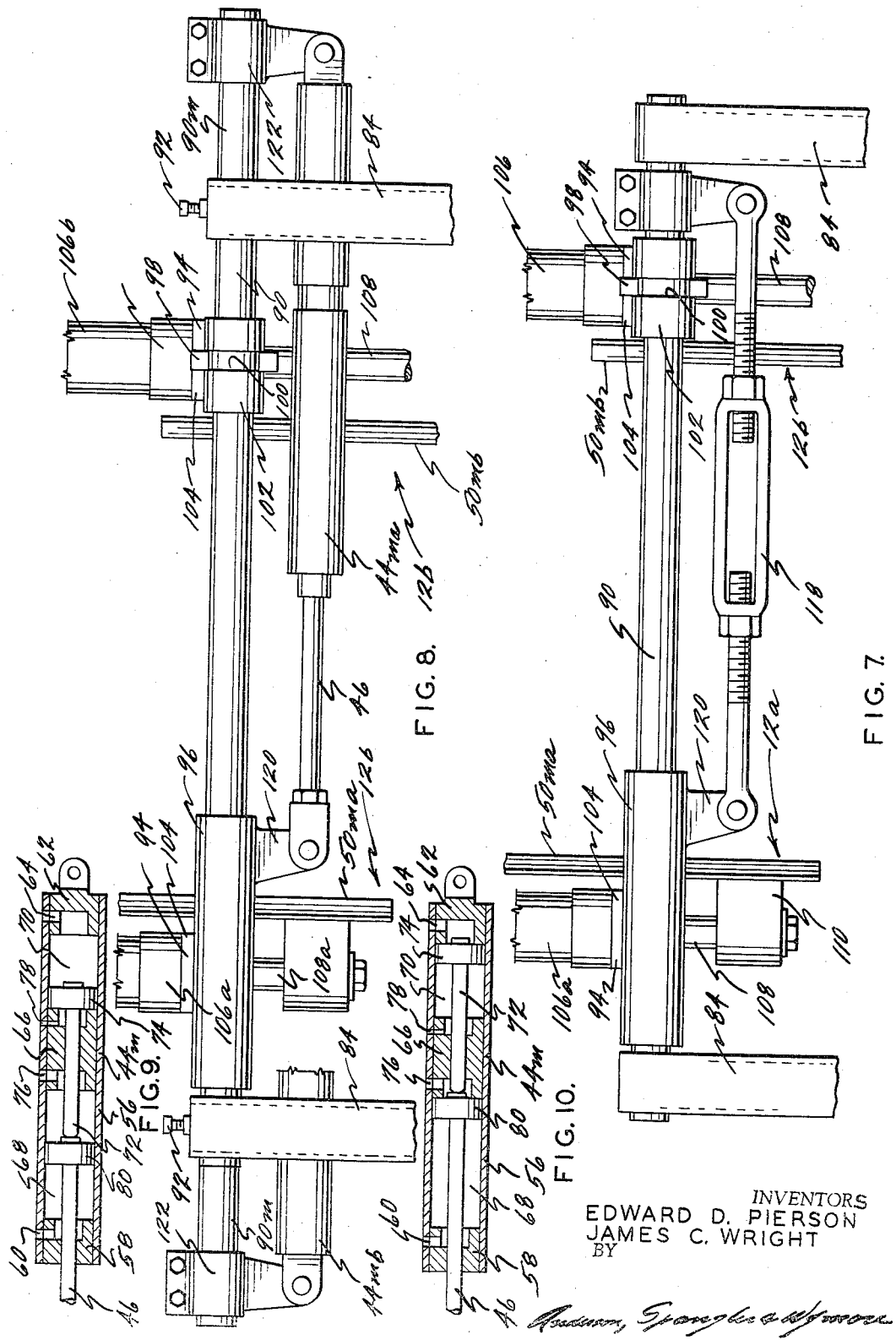

INVENTORS
EDWARD D. PIERSON
JAMES C. WRIGHT

INVENTORS
EDWARD D. PIERSON
JAMES C. WRIGHT
BY

INVENTORS
EDWARD D. PIERSON
JAMES C. WRIGHT

United States Patent Office 3,490,573
Patented Jan. 20, 1970

3,490,573
STOP-FOLLOWER CONVEYOR INTERSECTION
Edward D. Pierson, Denver, and James C. Wright, Aurora, Colo., assignors, by mesne assignments, to Cutler-Hammer, Inc., Milwaukee, Wis., a corporation of Delaware
Filed Nov. 16, 1967, Ser. No. 683,597
Int. Cl. B65g 47/52
U.S. Cl. 198—21                35 Claims

ABSTRACT OF THE DISCLOSURE

This invention relates to improvements in the corner transferring capabilities of T and X-shaped conveyor intersections used to transport loose stacks of folded newspapers and the like. More specifically, it deals with additions to the apparatus forming the subject matter of our U.S. Patents No. 3,232,409 and No. 3,134,476 in the form of automatic bundle stops and followers that engage and stabilize an otherwise unstable newspaper stack as the conveyor brings about a right angle change in its direction of travel. In the case of the bundle stop function, a retractable vertical barrier is placed in the path of a stack entering on the belt section of the corner transfer unit which the stack impinges against to prevent the papers from sliding atop one another as they are stopped and picked up by the interlaced rollers of the roller section. Then, once the stack is stopped, the barrier automatically retracts, freeing the stack to move off at right angles on the rollers. Conversely, in the bundle-follower mode, the barrier is located in the same position, namely, at right angles to the direction of stack movement on the belts; however, in this instance, the stack enters the corner transfer unit on the rollers parallel to said barrier. In this mode of operation, the function of the barrier changes to that of a "follower" which moves along behind the stack and prevents it from tilting backwards as it is suddenly accelerated out of the intersection. Functionally, the barrier operates in the manner above-described regardless of whether the intersection be that of the T or X configuration. In fact, the use of a special pneumatic servo-motor having a short retraction stroke and a long extension stroke to operate the barrier enables the latter to perform the alternative functions of a stop and a follower on the same unit, depending upon the direction at which the stack enters the corner. Mechanically, the design of the barier for the X and T intersections is quite different, the latter one being permanently located along an edge of the corner transfer unit while the former comprises an overhead elevatable barrier that can be moved up out of the way of the stack for straight-through operation. The most complicated of the units is that used for an X intersection where the stacks can enter in any one of four different directions necessitating two elevatable overhead barriers, either of which can function as both a stop or a follower.

The conveyor intersections and corner transfer units forming the subject matter of our aforementioned U.S. patents function admirably for stable packages such as cartons and tied or wrapped bundles; however, it was found that they possessed certain deficiencies when called upon to handle loosely stacked articles, especially stacks of newspapers. For a proper understanding and appreciation of the instant invention, it would, perhaps, be well to outline briefly the characteristics of a loose stack of newspapers and the orientation thereof with respect to the conveyor units forming the subject matter of our previously-mentioned patents and this application so as to cope most effectively therewith.

Newspapers are most often, conveyed from location to location in a newspaper plant folded in half in the case of a full-size paper or wide open in the instance of the so-called "tabloid" size. In either event, the folded edges are placed together in a stack thereof which, due to their greater thickness at this point, makes the stack considerably higher adjacent the folded edges than the parallel edges opposite thereto. As a result, such a stack is quite unstable and has a pronounced tendency to slip in the direction of the free edge opposite the fold as the individual papers are prone to slide down the incline extending downwardly at right angles from the fold. A lesser, but still significant, degree of instability is present in the opposite direction, i.e., toward rather than away from the folded edge. Now, this inherent instability of a loose stack of newspapers is seldom a problem while the stack is moving along at a uniform rate of speed and in more or less a straight line. On the other hand, any abrupt change in the speed of stack movement when the latter is moving in a direction perpendicular to the folded edges causes the stack to tilt and largely destroy the stacked relation. This effect is most pronounced when the stack is stopped abruptly or started moving from a position at rest.

Conversely, a loose-stacked bundle of newspapers is reasonably stable when being transported in a direction parallel to its folded edges as there seems to be little tendency for the individual papers to slide atop one another. Therefore, in accordance with the teaching of the instant invention, no provision need be made for stopping a stack moving into a corner in a direction parallel to its folded edge or to follow one moving off a corner in a direction parallel to its folded edge. It should be obvious from the above that the stop is employed to preserve the stacked relation whenever the loose bundle moves onto a corner in a direction perpendicular to its folded edges and a follower is needed when it moves off the corner in a direction at right angles to the folded edges.

It should, perhaps, also be mentioned at this point that, in some instances, loose stacks of newspapers are occasionally made up with approximately the top half thereof with the folded edges on one side and the bottom half with the folded edges on the other to improve stability; however, such a stack is still most unstable in a direction perpendicular to these folded edges and its maximum stability results when it moves in a direction parallel to these folds. Thus, the foregoing explanation applies equally well to the stack having all the folded edges on the same side and the stack having them split between opposite sides.

Now, the dominating characteristic of our patented conveyor intersections is that they include a fixed conveyor surface consisting of several V-belts arranged in spaced parallel relation to one another and a movable conveyor surface made up of a series of belt-supported and driven rollers interspersed between the fixed V-belt conveyor surface. The movable roller conveyor surface is movable vertically upon actuation from a depressed position beneath the V-belt conveyor surface to a superimposed position thereabove that lifts a conveyed article therefrom and changes its direction of movement 90° in either direction depending upon the direction of roller rotation.

The stop-follower subassembly of the instant invention is preferably positioned for practical reasons in perpendicular relation to the belt conveyor surface as is the case in each of the specific embodiments illustrated herein. As a result, the stack of loose papers moves onto or off of the belt conveyor with the folded edges thereof normal to the belts. Conversely, the stacks move along the roller conveyor section with their folded edges normal to the axes of roller rotation but parallel to the direction the stacks move thereon. Regardless of the pattern of stack movement, the versatility of the system is such that the above-described relation between the stacks and belt and roller conveyor surfaces is readily achieved through selection of the proper conveyor intersection model. While it is undoubtedly possible to move the stacks with their folded edges parallel to the roller axes by repositioning the stop-follower subassembly accordingly, the tendency of the parallel loose and folded edges to drop down between the rollers and tear or otherwise become damaged mitigates heavily against this mode of operation and favors the one shown herein.

It is, therefore, the principal object of the present invention to provide a novel and improved conveyor intersection especially adapted for handling loosely-stacked newspapers that incorporates a stop-follower subassembly.

A second objective of the invention herein disclosed and claimed is the provision of a loose-bundle stop that prevents the stack from tilting as it is brought to a stop and which retracts automatically to free said stack for movement off the intersection at right angles to its direction of entry.

Another objective is to provide a bundle-follower which pushes a loosely-stacked bundle off a conveyor intersection without allowing it to slip backward under the influence of rapid acceleration from a complete stop.

Still another objective of the above-described invention is to combine both the stop and follower functions into a singe movable barrier so that the intersection can receive and discharge loosely-stacked newspaper bundles in two or more directions by means of a single corner transfer unit.

An additional object is to provide a combination stop-follower subassembly for corner transfer units that is automatically actuated in response to the presence of a stack entering the unit.

A further object is to provide a corner transfer unit with provision for stopping and following a loose stack that is simple, efficient, versatile, fast, compact, rugged and easy to service and maintain.

Other objects will be in part apparent and in part pointed out specifically hereinafter in connection with the description of the drawings that follows, and in which:

FIGURE 1 is a top plan view of a "T-intersection" corner transfer unit equipped with the stop-follower subassembly of the present invention.

FIGURE 2 is a left side elevation of the back of the stop-follower subassembly as it would be seen looking to the right in FIGURE 1;

FIGURE 3 is a section taken along line 3—3 of FIGURE 2;

FIGURE 7 is a fragmentary detail to an enlarged scale showing one of the overhead X-type intersections equipped with an adjustable rigid link instead of a pneumatic servo-motor to create an elevatable fixed stop;

FIGURE 8 is a fragmentary detail to an enlarged scale illustrating the pneumatic servo-motor that operates the stop-follower;

FIGURE 9 is a detailed diametrical section showing the details of the pneumatic servo-motor when in "stop" mode;

FIGURE 10 is a section similar to FIGURE 9 showing the servo-motor in "follower" mode;

Figure 4:
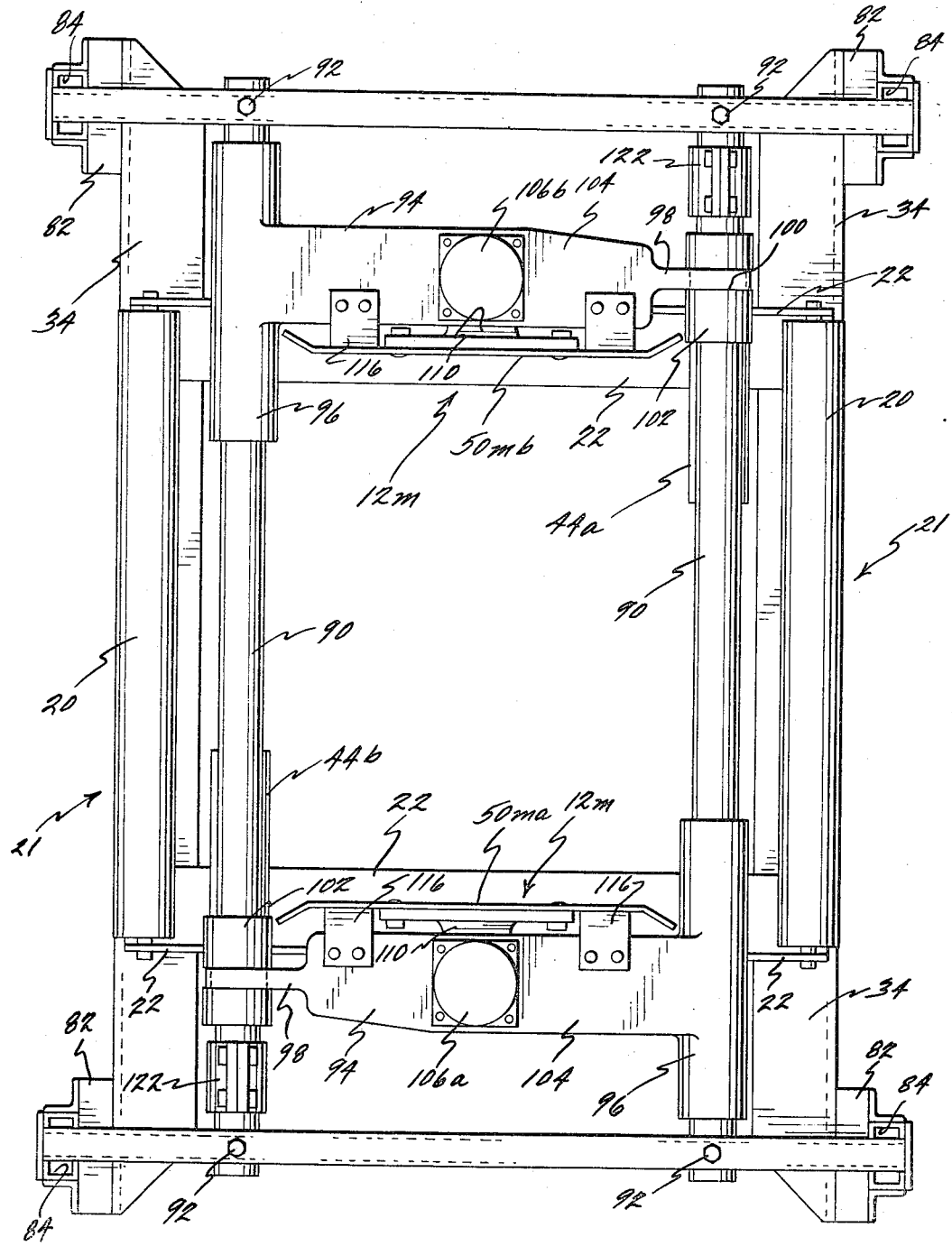
FIGURE 4 is a top plan view of an "X-intersection" corner transfer unit equipped with a pair of elevatable stop-follower subassemblies.

Referring now to the drawings for a detailed description of the present invention and, initially, to FIGURE 1 for this purpose, reference numeral 10 has been employed to broadly designate a corner transfer unit of a type substantially identical to those forming the subject matter of our U.S. Patents 3,134,476 and 3,232,409, except that they have been modified to include the stop-follower subassembly of the present invention which has been indicated in a general way by reference numeral 12. In the form illustrated, corner transfer unit 10 has been set up as a simple right angle cornering device wherein a loose stack entering from the top will be moved out to the right or, alternatively, a stack entering from the right will move off toward the top. As explained in detail in our U.S. Patents 3,232,409 and 3,134,476, a system of four parallel V-belts 14 reaved between specially-designed sheaves 16 and 18 cooperate to form a non-elevating belt conveyor surface 15 adapted to move the loose stacks conveyed thereon both toward and away from the stop-follower subassembly 12 in a direction normal thereto. The direction of movement of belts 14 is controlled by a reversible drive means (not shown) which is connected in driving relation to one of the sheave subassemblies 16 or 18.

Belts 14 are interlaced between rollers 20 that comprise a second elevatable roller conveyor surface 21 which, when actuated into an elevated operative position above the belt conveyor surface 15 functions to bring about a 90° change in direction of the stack so that the latter is moving parallel to the stop-follower subassembly 12. Rollers 20 are journaled for rotation within a "floating" roller frame 22 that rests atop a pair of driven belts (not shown) that run in either direction at right angles thereto. When the time comes to change the direction of stack movement from a direction normal to the stop-follower subassembly 12 to one parallel thereto, the roller conveyor subassembly 21 is automatically elevated into an operative position wherein the stack is lifted free of the belt conveyor surface 15 and moved off the intersection. Conversely, a stack moving onto the intersection on the roller conveyor surface 21 in a direction parallel to the stop-follower subassembly is automatically conveyed away from the intersection, either by letting it pass therethrough in straight-line relation on the rollers 20 or, if desired, by dropping the roller conveyor surface 21 to an inoperative position below the belt conveyor surface 15, whereupon the stack changes direction 90° and moves off the intersection on the latter conveying surface. As the stack moves off the intersection to the right as viewed in FIGURE 1, it is picked up by a roller conveyor extension subassembly that has been broadly indicated by reference numeral 24 and which functions primarily as a gate that can be raised up to permit the movement of personnel across the conveyor line, the latter being somewhat unhandy to accomplish with fixed conveyor sections adjoining the intersection.

A great deal more could be said concerning the construction and operation of the intersection; however, no useful purpose would be accomplished by doing so when the details thereof are fully set forth in our U.S. Patents 3,134,476 and 3,232,409 aforementioned, to which specific reference should be made. For this reason, there has been no attempt to illustrate the structural details of the intersection apart from those basic elements thereof that help illustrate the construction, function and operation of the stop-follower subassembly 12 to which this application is specifically directed.

Now, as seen in FIGURES 1, 2 and 3, subassembly 12 includes a mounting bracket 26 having L-shaped endpieces 28 containing parallel slots 30 by means of which the unit can be adjustably fastened to space parallel uprights 32 attached to the main intersection frame 34 for movement toward and away from the belt and roller conveyor surfaces. Member 36 of the bracket that interconnects the upturned flanges of the endpieces is, in the particular form shown, of hollow rectangular cross section and has a similarly-shaped centerpost 38 rising vertically from the midpoint thereof. The horizontal flange 40 of an L-shaped servo-motor mounting bracket sits atop centerpost 38 while the vertical flange 42 thereof mounts pneumatic servo-motor 44 in positon such that the piston rod 46 projects out over the conveying surfaces when extended.

Affixed to the free end of piston rod 46 by means of connector 48 is a flat perpendicular plate 50 which, as will be explained presently, can function as a retractable stop, an extendable follower, or both, depending upon the type and function performed by the servo-motor which, in turn, is determined by the particular function or functions the corner transfer unit is to perform in the overall conveyor system. As illustrated, servo-motor 44 is of the conventional type that is pneumatically powered in both directions by alternately introducing and exhausting air through conduits 52a and 52b. Plate 50 is shown retracted in FIGURE 3 and by full lines in FIGURE 1, with the extended position thereof being shown by dotted lines in FIGURE 1. Thus, the set-up illustrated in FIGURE 1 is that of an L cornering device wherein the stacks enter the corner on belts 14 so as to impinge against plate 50 in extended dotted-line position; whereupon, servo-motor 44 actuates to retract the plate 50 to its full line position and the stack leaves the corner at the top on dotted-line roller conveyor 54 unhampered by the plate engaging the side thereof. Exactly the same corner unit would be used to discharge stacks in the opposite direction. The rollers 20 would be merely set to rotate the other way by reversing the drive therefor. The T-intersection would, likewise, be the same with rollers 20 being reversed at predetermined intervals or in response to the presence of a pre-set number of stacks. Thus, as long as the stacks enter the intersection on the belts, plate 50 functions as a retractable stop regardless of whether the corner transfer unit 10 is designed to turn the stacks to the right or left or both.

Next, if the stack enters the corner transfer unit 10 on the rollers 20 with the folded edges parallel to plate 50, the stack need not be stopped against a vertical abutment because it is stable in this direction. On the other hand, as the stack accelerates off the corner transfer unit on the belts 14, it slips and tends to fall backwards unless the elements thereof (the newspapers) are maintained in stacked relation by an extendable follower until it accelerates up to approximately the speed of the discharge conveyor (not shown) it is delivered to. If the function of the unit is as outlined, the only change in the unit is to substitute a slightly different servo-motor 44 having a longer stroke as shown schematically in FIGURES 14 and 15. Suitable throttling valves should be connected in the air line so as to match the rate of plate extension as nearly as is practicable to the rate of belt conveyor movement. Thus, as soon as the stack drops down onto the belts 14 when the rollers 20 lower therebetween, the servo-motor would actuate and move plate 50 along behind the stack as it exits onto belt conveyor extension 24.

The third mode of operation is a combination of the two just described wherein the belt conveyor mechanism is reversible so that the stack can either enter or leave on the belts. This means, of course, that the plate 50 must be capable of functioning as both a retractable stop and an extendable follower. To do so, it is merely necessary to substitute the special double-piston pneumatic servo-motor 44m illustrated in FIGURES 9 and 10 for the simpler single-piston ones previously described. Accordingly, reference will now be made to FIGURES 9 and 10 for a detailed description of the operation of servo-motor 44m.

Servo-motor 44m is, in effect, two servo-motors mounted in end-to-end relation in a common housing 56. Tubular housing 56 has a front cylinder head 58 with an axial opening therethrough to receive piston rod 46 and also a side-opening port 60. The rear cylinder head 62 contains side-opening port 64, while the intermediate head 66 partitions off the interior of the housing into front and rear chambers 68 and 70, respectively. This intermediate head has an axial opening that receives the rod 72 of rear piston 74 for reciprocal movement and a front port 76 that communicates chamber 68 along with a rear port 78 that connects into rear chamber 70.

Figure 11:
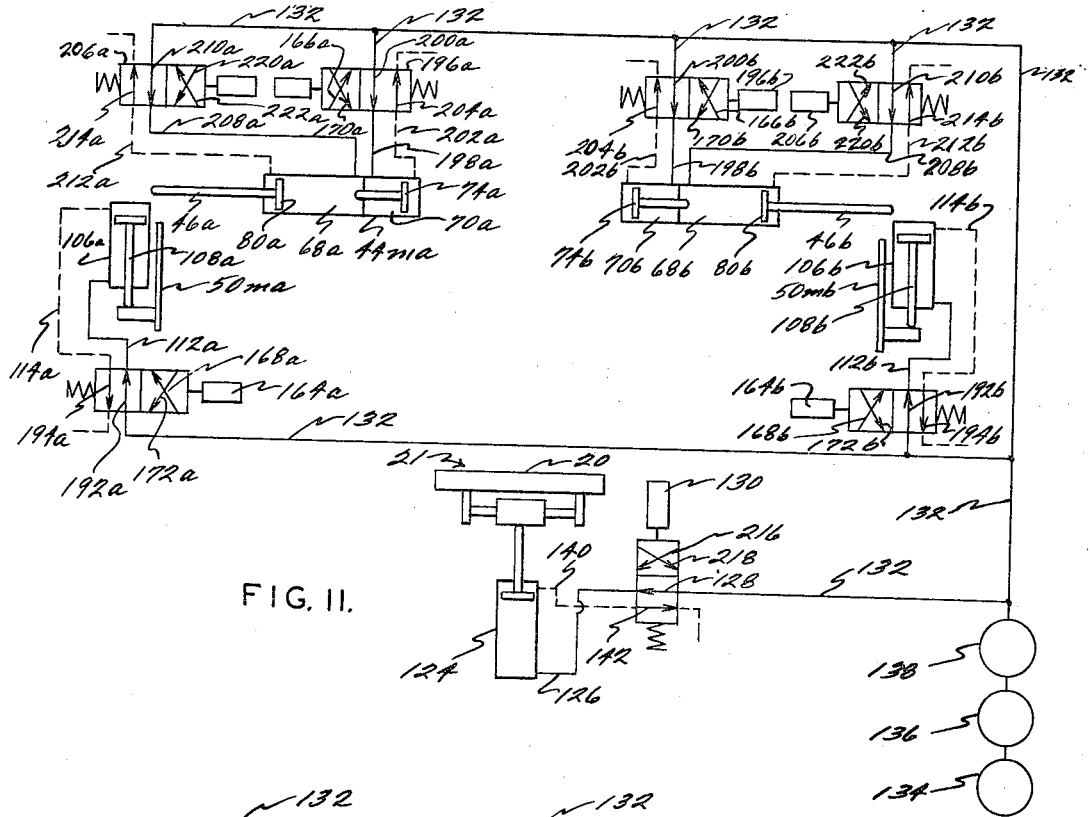
FIGURE 11 is a schematic showing a double overhead combination follower-stop of the type shown in FIGURE 8.
Figure 13:
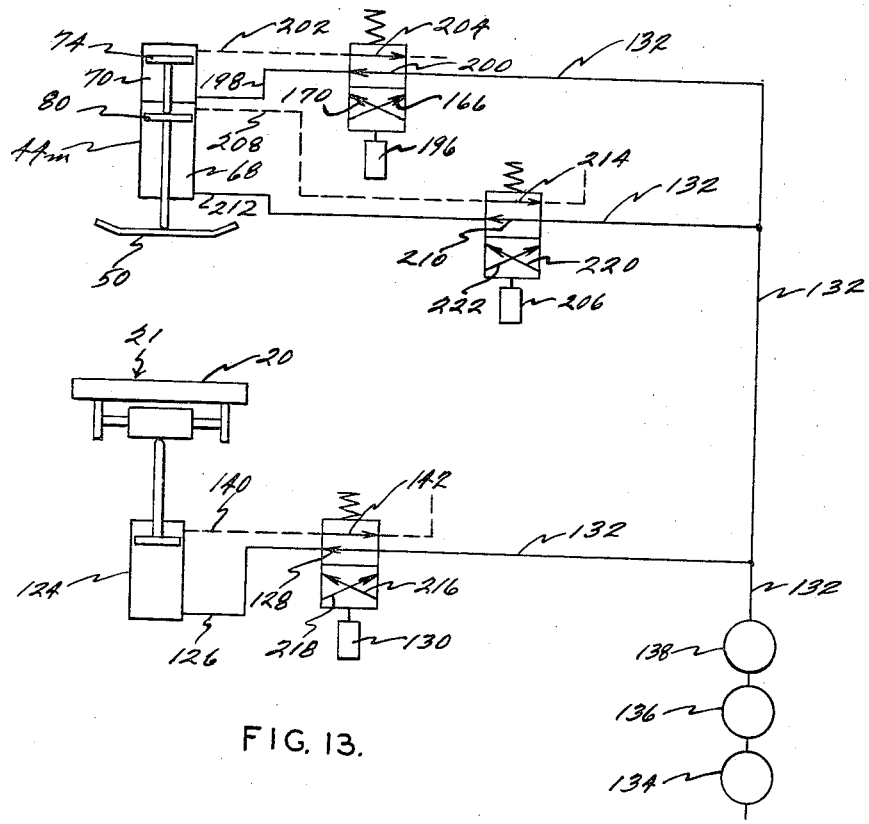
FIGURE 13 is a schematic showing a side-mounted combination follower-stop on a T-corner transfer unit.

Now, when the unit is programmed to operate as a retractable stop, the front piston 80 need only be retracted a short distance to clear the side of the stack while it moves off the corner on the roller conveyor surface. Accordingly, front piston 80 is restricted to a short stroke by introducing air behind the rear piston 74 through port 64 so as to extend rod 72 into chamber 68 as shown in FIGURE 9. These two pistons cooperate to actuate a retractable stop in two different ways, depending upon whether they "push" or "pull" it; therefore, a detailed description of these functions will be deferred until the pneumatic schematics of FIGURES 11 and 13 are set forth in detail.

In the "follower" mode, on the other hand, the maximum stroke of piston rod 46 is desirable; therefore, the rear piston 74 is fully retracted in chamber 70 by introducing air ahead thereof. In so doing, the excursion of piston 80 is from the front face of intermediate head 66 to the rear face of the front head 58. Thus, by the simple expedient of substituting one of the servo-motors 44m which, by the way, is a commercially-available item, for one of the simpler servo-motors 44 previously described, the unit can function as either a stop or a follower.

Next, with reference to FIGURES 4–8, inclusive, the more complex version of the stop-follower subassembly 12m will be described in detail as it is modified for use with an "X-intersection." The problem here, of course, is simply one of getting the plate 50m out of the way so that the stacks can pass straight through the intersection on the belt conveyor. The unit illustrated in FIGURE 8 is the most complex of the several "X-intersection" models in that it has two complete stop-follower subassemblies, either or both of which may be retracted.

Attached by suitable brackets 82 mounted on the corners of the main intersection unit frame 34 are four uprights 84. The upper ends of these uprights are, in turn, interconnected by spaced substantially parallel horizontal elements 86 that cooperate with said uprights to define rectangular arches 88 opening onto the belt conveyor surface 15 and at right angles to the roller conveyor surface 21. These arches are of a width and height to easily pass a loose stack of newspapers.

The two parallel arches thus formed are, in turn, connected to one another by a pair of spaced parallel rods 90 that pass through openings in the horizontal members 86 within which they are fastened by set screws 92 as shown. As revealed most clearly in FIGURES 4 and 6, rods 90 are spaced inwardly of uprights 84.

Bridging the space between rods 90 are a pair of special fittings 94 that form sliding overhead supports for plates 50m located in spaced parallel relation at opposite sides of the corner transfer conveyor surfaces 15 and 21. On one end of these special fittings is a tubular portion 96 mounted for free-sliding movement on one of the rods 90. The other end of fitting 94 terminates in a vertically-disposed bifurcated tongue 98 that is most clearly revealed in FIGURE 6 and which connects into an annular groove 100 provided on the cylindrical outer surface of sleeve element 102 which is mounted for free-sliding movement on the other of said rods 90. Interconnecting tongue 98 and tubular portion 96 is a generally T-shaped portion 104, the horizontal surface of which mounts pneumatic servo-motor 106. As shown in FIGURE 4, fittings 94 are identical and reversed end-for-end so that the tubular portions 96 thereof run along different rods 90.

Figure 5:
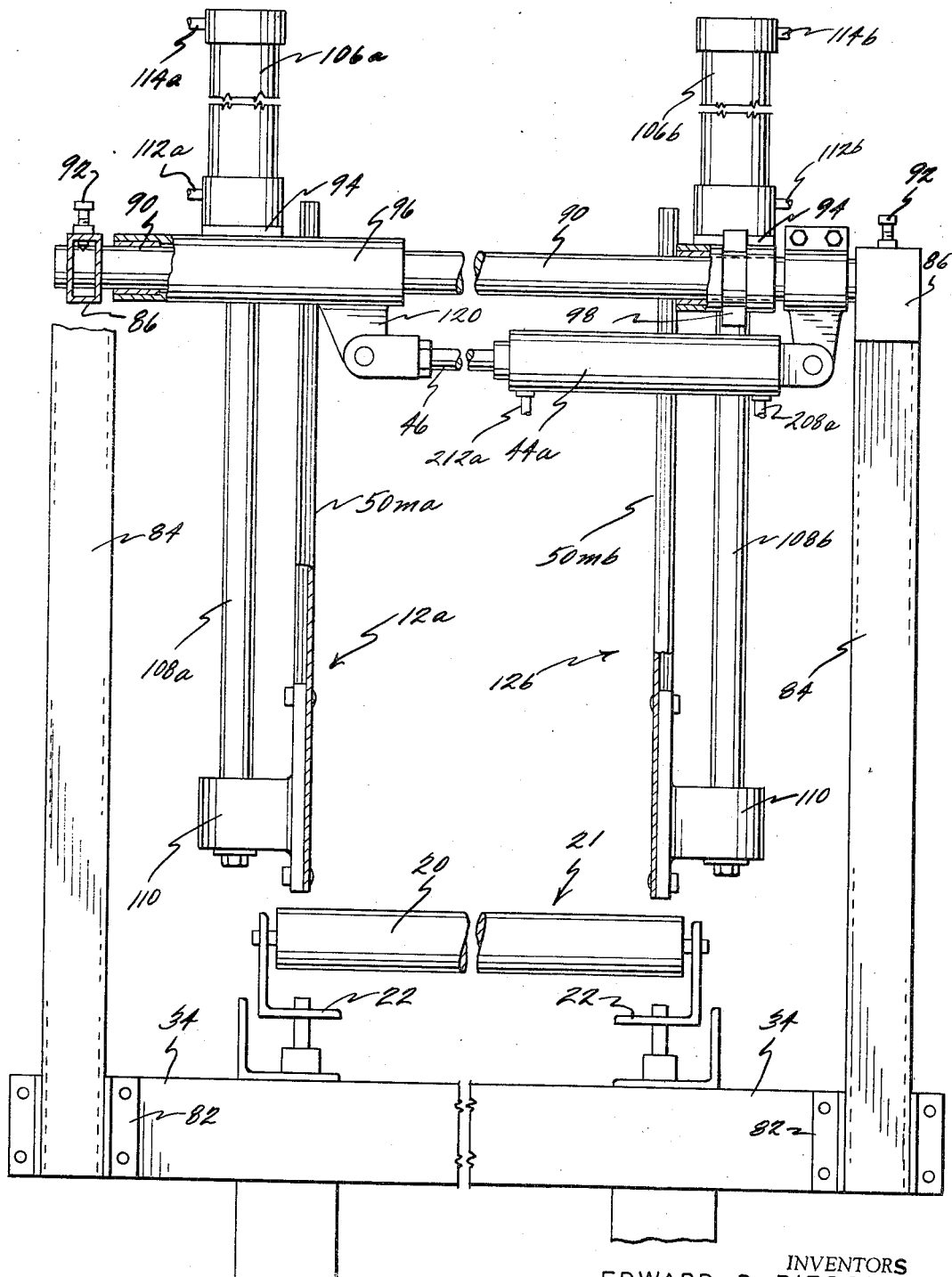
FIGURE 5 is a front elevation of the unit of FIGURE 4, portions having been broken away to conserve space while other portions have been broken away and shown in sections to more clearly reveal the interior construction.
Figure 6:
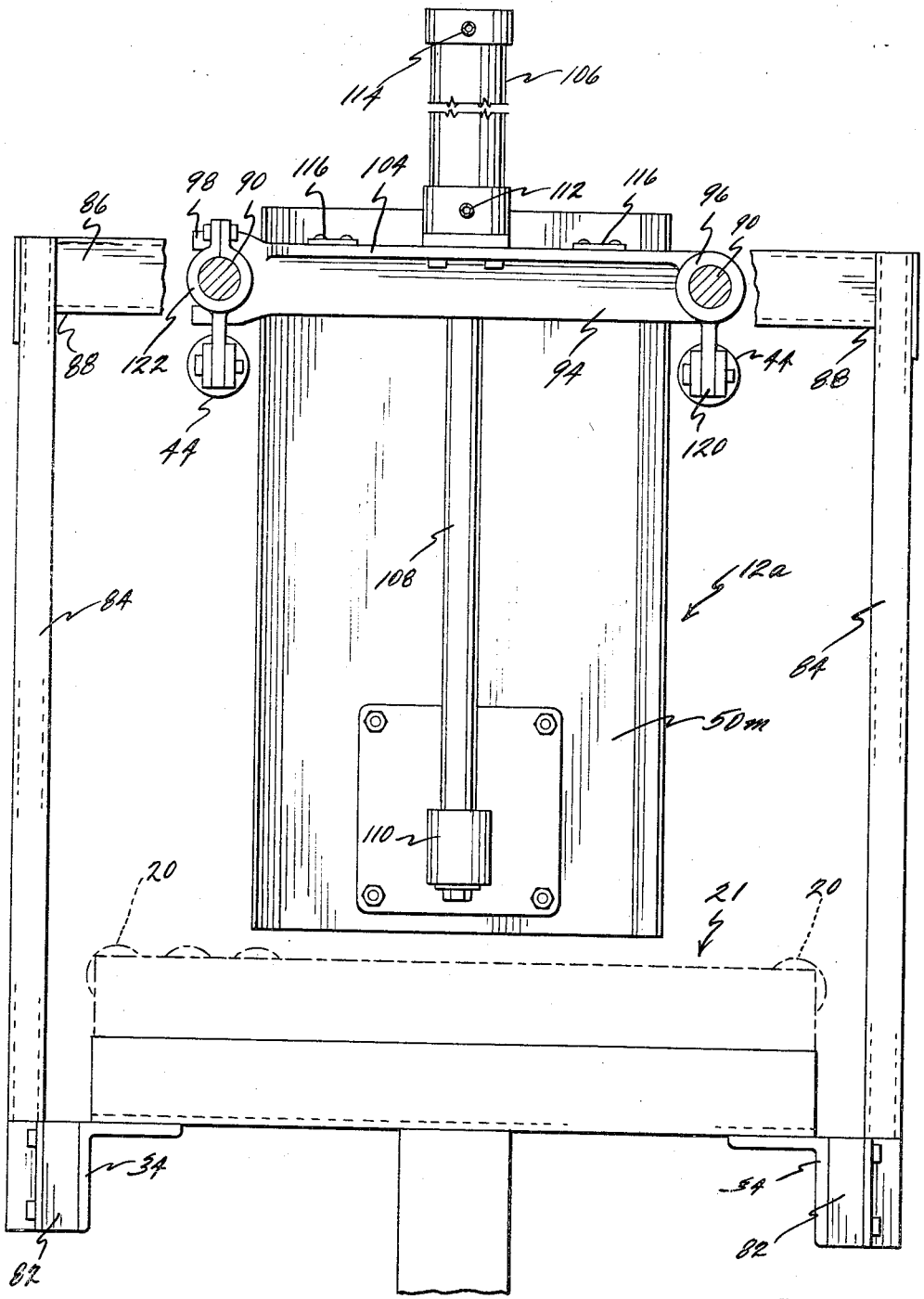
FIGURE 6 is a side elevation of the unit of FIGURES 4 and 5, portions of the supporting structure having been broken away to better reveal the construction.

The piston rod 108 of each of the two identical servo-motors (106a and 106b) projects downward vertically through a suitable opening (not shown) in the platform of element 104 to a point of attachment with connector 110 fastened to the rear face of plate 50m near the lower edge thereof. As shown, connector 110 holds plate 50m in position to move vertically up and down in front of fitting 94 upon actuation of the servo-motor 106 which is of the conventional double-acting type powered in both directions by alternately feeding and exhausting compressed air therein through conduits 112 and 114. The cylinders of servo-motors 106 have been shown broken away and considerably foreshortened to conserve space, it being obvious that they must each accommodate nearly the full length of rods 108 which, in turn, are at least as long as the height of plates 50m in order to raise the latter clear of a loose stack passing therebeneath on the conveyors. As illustrated, the upper edges of plates 50m carry a pair of L-shaped stops 116 that overhang the platform of element 104 and thus limit the extent to which the lower edges of the plates can approach the conveyor surfaces of the intersection. FIGURES 5 and 6, of course, show the plates 50m lowered into operative position while in FIGURES 7 and 8, one of said plates is shown raised up into its inoperative position.

Next, with particular reference to FIGURE 7, a simplified form of the unit has been illustrated wherein one or both of the plates 50m become adjustable "fixed" stops. In other words, while both of the plates 50m can be raised up out of the way to permit a stack or bundle to pass therebeneath, they perform no "follower" action, nor do they retract horizontally to clear a bundle that has stopped thereagainst. The only horizontal movement is that by which they are adjusted to and fro by means of turnbuckle 118 interconnecting ear 120 projecting beneath tubular portion 96 and clamp-type connector 122 that is secured to the same pipe 90 as the latter element between fitting 94 and cross frame element 86.

When the intersection is incorporated into a material handling system that is being used to move stable packages such as, for example, cartons and tied bundles, there is little necessity for either a retractable stop or any kind of follower; therefore, a fixed stop of the type shown in FIGURE 7 will suffice. It has the advantage over the prior art fixed stops in that it can be instantly raised up out of the way into an inoperative position when the articles being conveyed thereon are programmed to move straight through the intersection on the belt conveyor portion of the corner transfer unit. On the other hand, one of the two stops would be lowered into operative position whenever an article moved onto the corner transfer unit on the belts from either direction to be conveyed away on the roller conveyor unit.

In FIGURES 4 and 5, an "X-intersection" of slightly greater complexity and versatility has been illustrated wherein servo-motor 44 has been substituted for turnbuckle 118. Servo-motor 44 is powered pneumatically through both its extension and retraction strokes as previously mentioned.

The overhead unit of FIGURES 4 and 5, due to the use of a single-piston servo-motor 44, is preferably limited to either the "retractable-stop" function or the "extendable-follower" function, but not both; however, there is nothing to prevent using one of the plates as a retractable stop while the other is used as an extendable follower by selecting servo-motors with strokes appropriate to these different functions. Of course, it is entirely possible to use servo-motors 44m to perform both functions by merely reversing the flow therethrough; but, as a practical matter, this involves a fair amount of change in the stack-sensing and control systems which cannot be justified when this greater degree of versatility is much more easily attained through the use of the double-piston servo-motors of FIGURES 9 and 10. In other words, in case it is not already apparent, the overhead "X-intersection" equipped with the double-stroke servo-motors 44m shown in FIGURE 8 is capable of performing the most complicated of the operations which units of this type can handle and, at the same time, any and all of the less complicated functions. As a practical matter, however, the average material handling installation has reasonably fixed material-flow patterns so that most of the intersections need not possess maximum versatility and one or more functions can, therefore, be eliminated therefrom at a considerable saving in cost. In this same connection, it is also important to note that both the side-mounted and overhead units can easily, and at minimum expense, be converted to one of the more complex and versatile forms by the simple expedient of substituting a different type of servo-motor and making the necessary changes in the sensing and control circuits.

Briefly with regard to FIGURE 8, it differs from the structures of FIGURES 4, 5 and 7 primarily in the substitution of servo-motor 44m for either the turnbuckle 118 or the simpler servo-motor 44. Due to the longer length of the servo-motor 44m to accommodate the two pistons, etc., it is necessary to extend rods 90 by adding thereto extensions 90m.

Figure 16:
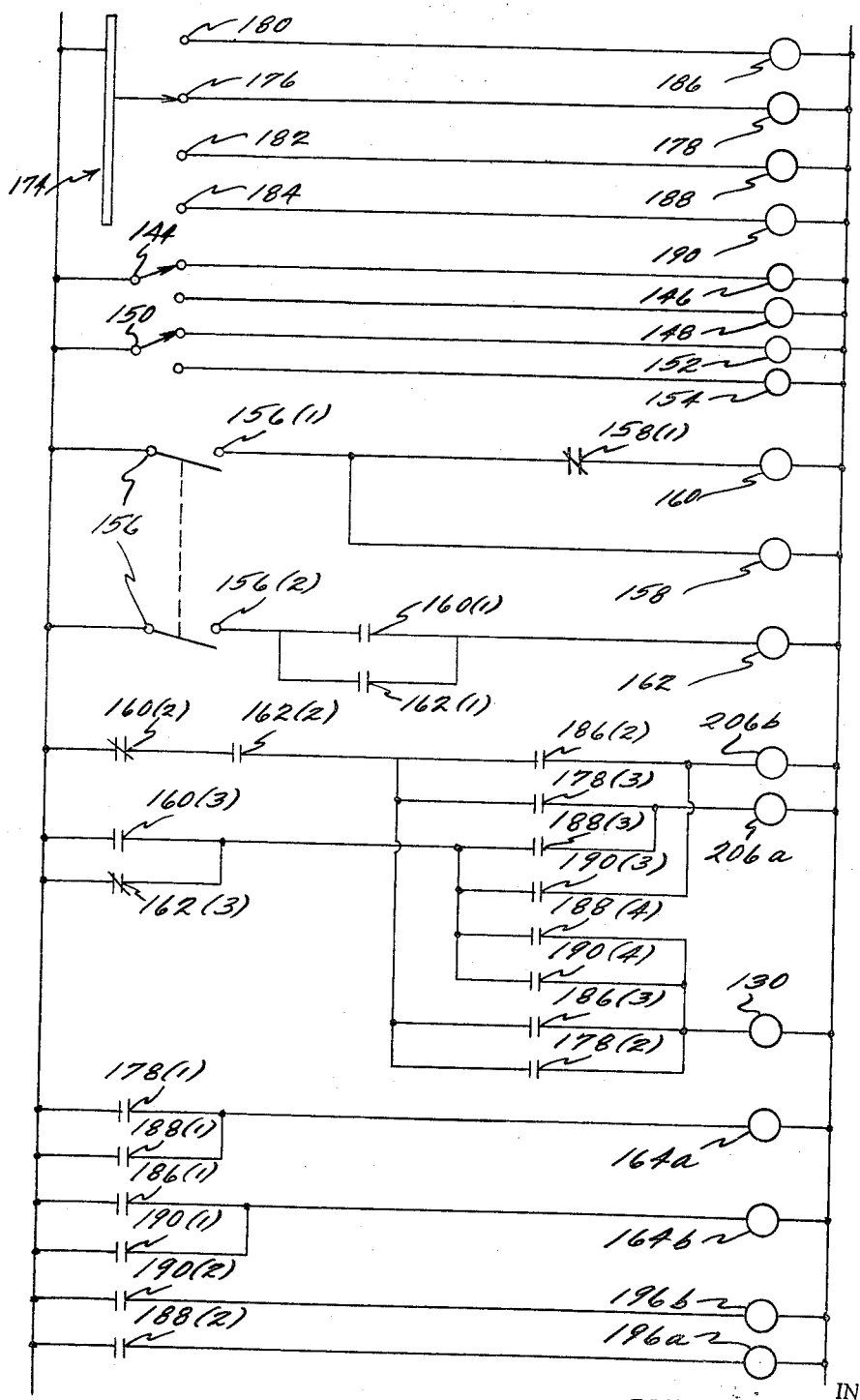
FIGURE 16 is a schematic electrical diagram showing control circuitry capable of operating either of the units diagrammed in FIGURES 11 and 12.

Referring now to FIGURES 11 and 16, the most complex of the systems illustrated herein will be described in detail, namely, an "X-intersection" equipped with a pair of elevatable stop-follower subassemblies. In the particular form shown in FIGURE 11, the roller conveyor surface 21 is elevated into operative position by actuating pneumatic servo-motor 124 through line 126 that enters the bottom of the latter servo-motor. Line 126 is connected through port 128 of solenoid valve 130. On the other side of valve 130, line 126 connects into a high pressure air line 132 containing conventional filters, pressure regulators and lubricators that have been identified by numerals 134, 136 and 138, respectively. The air from the top of servo-motor 124 is exhausted to the atmosphere through line 140 and port 142 of solenoid valve 130.

With the roller conveyor surface 21 elevated into operative position, the stack enters the intersection thereon in either direction and may pass therethrough in a straight line or be turned right or left onto the belt conveyor surface 15. In FIGURE 16, it will be noted that switch 144 alternately energizes elements 146 and 148 to reverse the direction of roller movement, the particular mechanisms for accomplishing the latter having been set forth in detail in our earlier patents already identified. Obviously, with both stop-follower elevating servo-motors 106a and 106b actuated to raise plates 50ma and 50mb up into inoperative position, it becomes possible to run a stack straight through the intersection on the belt conveyor surface 15 provided, of course, that servo-motor 124 is actuated to lower the rollers. Reversal of the belt conveyor surface 15 is controlled by switch 150 which, in its two positions, alternately energizes elements 152 and 154 that bring about a reversal in the direction of belt travel as explained in our earlier patents.

In the instant system, however, we are primarily concerned with right angle transfers at the intersection wherein the "stop" and "follower" functions come into play. As aforesaid, with the roller conveyor surface 21 "up" as in FIGURE 11, the stop-follower subassemblies will be functioning in the "follower" mode to follow the stacks off onto the belt conveyor surface 15 after the rollers 20 have been lowered. For purposes of distinguishing between the two identical stop-follower subassemblies, identical reference numerals will be used for like components followed by the letter designations "a" and "b". Now, in every instance where the stack enters on the rollers 20 and makes a right angle turn in the intersection, one of the stop-follower subassemblies (12a or 12b) must be elevated up into inoperative position while the other is lowered into operative position where it can perform the "follower" function.

The first element of the control circuitry that requires some explanation is normally-open sensing switch 156 which, for purpose of simplicity, will be considered as if it were located in the center of the intersection and, therefore, capable of sensing the presence of a stack entering said intersection in any one of four different directions. Actually, the "X-intersection" of the present invention may employ as many as four separate sensing devices such as photoelectric cells positioned at the corners of the intersection and adapted to serve both the leading and trailing edges of a stack moving in front thereof. No useful purpose would be served by complicating the description of the control circuitry of the instant device by including four such sensing mechanisms when they have already been described in detail in our earlier Patent No. 3,232,409.

Secondly, a control system based upon a single centrally-located sensing device 156 must include a first time-delay means including a timer 158 and a relay 160 which cooperate with sensing means 156 to permit the stack to move on across the latter element and arrive at a position substantially centered within the intersection and adjacent the stop-follower subassembly before such subassembly is actuated and the cornering function begins. In conjunction with the aforesaid first time-delay means and sensing means, it is also necessary to provide a second time-delay means in the form of a multiple-contact timer 162 which functions upon reopening of the stack-sensing switch 156 to delay return of the corner transfer unit and stop-follower subassembly to their original conditions until such time as the stack has cleared the intersection.

Looking now at FIGURE 11, we will assume that the stack is entering from above in a direction normal to the plane of the sheet on the rollers 20 and will pass out to the right, i.e. entering from the right in FIGURE 4 and passing out through the top. With this the situation, servo-motor 106b is actuated into the "up" position retracting plate 50mb as illustrated, while the companion servo-motor 106a is actuated to lower plate 50ma into operative position by energizing solenoid valve 164a which connects the high pressure in line 132 into conduit 114a through valve port 168a so as to extend piston rod 108a. The air ahead of the piston in servo-motor 106a is exhausted to the atmosphere through conduit 112a and valve port 172a. Solenoid valve 164a is energized as shown in FIGURE 16 by actuating mode switch 174 onto contact 176 thereof. This energizes the coil of relay 178 which, in turn, closes contact 178(1) that energizes solenoid valve 164a and lowers plate 50ma into operative position. Mode switch 174 has four contacts, only one of which is closed at a time; therefore, with the mode switch on contact 176, contacts 180, 182 and 184 thereof are open as are the coils of relays 186, 188 and 190 associated therewith. As long as coils 186, 188 and 190 remain de-energized, their normally-open contacts 186(1), 186(2), 186(3), 188(1), 188(2), 188(3), 188(4), 190(1), 190(2), 190(3) and 190(4) are likewise open. With contacts 186(1) and 190(1) open, solenoid valve 164b remains de-energized so that the high pressure in feed line 132 is fed in below piston 108b by means of line 112b and valve port 192b, thus elevating plate 50mb up into its inoperative position. Air is exhausted from atop piston 108b through 114b and valve port 194b to the atmosphere.

With plate 50mb raised up and inoperative, both the stop and follower functions of the latter should be disabled and it should, in addition, remain retracted. Open contact 190(2) leaves solenoid valve 196b de-energized, thus retracting piston 74b of servo-motor 44mb. When solenoid valve 196b is de-energized, high pressure from line 132 passes through line 198b, port 200b of solenoid valve 196b into chamber 70b ahead of piston 74b. Exhaust air from chamber 70b passes out through conduit 202b and valve port 204b to the atmosphere.

Similarly, with contacts 186(2) and 190(3) open, solenoid valve 206b will be de-energized so that the high pressure in line 132 is fed in behind piston 80b of servo-motor 44mb by means of line 208b and valve port 210b. This, of course, extends piston 80b which holds plate 50mb in fully retracted position. Exhaust air from ahead of piston 80b is taken out through line 212b and valve port 214b.

The right-side stop-follower subassembly 12b is thus completely deactivated so that the stacks can pass out on the belt conveyor surface 15 therebeneath. We will now turn our attention, once again, to the left-side stop-follower subassembly 12a which is lowered into operative position and ready to follow the stacks off to the right. In the "follower" mode, piston 74a is fully retracted because solenoid valve 196a is in the same de-energized state as valve 196b due to the fact that the coil of relay 188 is de-energized and normally-open contact 188(2) thereof that controls extension of piston 74a remains open. Thus, the high pressure from line 132 is fed in ahead of piston 74a through line 198a and valve port 200a while being exhausted through line 202a and valve port 204a.

When the unit is set up as detailed above, a stack entering on roller conveyor surface 21 will close normally-open double-pole single-throw sensing switch 156 completing circuits through its contacts 156(1) and 156(2). The circuit through contact 156(1) and normally-closed contact 158(1) energizes the coil of relay 160 and, at the same time, the circuit through 156(1) energizes the coil of timer 158. Normally-open contact 160(1) closes completing a circuit through the other closed contact 156(2) of the sensing switch 156 to energize the coil of timer 162. When the coil of timer 162 is energized, its normally-open contact 162(1) that shunts around contact 160(1) closes and holds after relay 160 de-energized opening contact 160(1) again.

When the coil of relay 160 is energized, its normally-closed contact 160(2) opens and its normally-open contact 160(3) closes. Simultaneously, as the coil of timer 162 is energized, its normally-open contact 162(2) closes and its normally-closed contact 162(3) opens.

Now, as soon as timer 158 is energized, it delays the opening of its normally-closed contact 158(1) for the predetermined time interval required for the stack to reach a position substantially-centered within the intersection and in close proximity to plate 50ma which will follow it off on the belt conveyor surface. When timer 158 times out and its normally-closed contact 158(1) opens signifying location of the stack in position to have its direction of movement changed 90° to the right or left, the coil of relay 160 deenergizes and its previously-opened normally-closed contact 160(2) recloses and its previously-closed normally-open contact 160(3) reopens.

Before the stack entered the intersection to close switch 156, solenoid valve 130 was de-energized and the roller conveyor surface 21 was elevated into operative stack-receiving position because said solenoid valve was connected in series with normally-closed contact 160(2) of relay 160, normally-open contact 162(2) of timer 162 and normally-open contact 178(2) of relay 178 which was closed when relay 178 was energized upon closure of the mode selector switch 174 through contact 176. Now, if timer 162 were to become energized a few milliseconds prior to timer 158, solenoid valve 130 would be momentarily energized to drop the roller conveyor surface as a circuit would be established through closed contacts 160(2), 162(2) and 178(2); therefore, to insure that contact 160(2) has opened before contact 162(2) closes, timer 162 is connected in series with contact 160(1) of relay 160, thus insuring that contact 160(2) has opened before contact 162(2) can close.

Getting back to the point in time where the stack is in centered position on the intersection and the roller conveyor 21 must be dropped down to place the stack on the belts 14, timer 158 has timed out opening its contact 158(1) to de-energize relay 160 so that contact 160(2) of the latter recloses and the circuit is complete through 178(2) and 162(2), the latter remaining closed because timer 162 remains energized due to the stack still resting atop switch 156 to keep it closed. Energization of solenoid valve 130 actuates to connect the high pressure in line 126 into the top of servo-motor 124 by means of valve port 216 and line 140 while exhausting air from therebeneath through line 126 and valve port 218 to the atmosphere.

Substantially simultaneously with the energization of solenoid valve 130, solenoid valve 206a controlling the passage of air through the front chamber 68a of servo-motor 44ma is energized to retract piston 80a so as to extend plate 50ma that follows the stack off the belt conveyor surface and keeps it from tipping over backwards. Energization of solenoid 206a connects the high pressure into chamber 68a ahead of piston 80a through line 212a and valve port 220a while exhausting same through line 208a and port 222a. Solenoid valve 206a, is as might be expected, connected to include contacts 160(2) and 162(2), along with normally-open contact 178(3) which closed when the mode switch was placed on contact 176 as aforesaid. As shown, solenoid valve 130 and contact 178(2) are connected in parallel with solenoid valve 206a and contact 178(3) so that both of these solenoid valves are energized simultaneously upon reclosure of contact 160(2).

Next, as the stack exits on the belt conveyor surface 15, it leaves switch 156 and allows it to return to its normally-open position; however, the system is not yet ready to return to its original condition because the stack has not cleared the intersection. Accordingly, when switch 156 reopens, timer 162 de-energizes through its own contact 162(1). As soon as timer 162 is de-energized as above-stated, its timer is actuated for the preset time interval necessary to insure that the stack has cleared the intersection. Accordingly, even though timer 162 is de-energized, its contacts 162(1) and 162(2) remain closed while its third contact 162(3) remains open until said timer times out; whereupon, the parallel circuits to solenoid valves 206a and 130 open to permit the servo-motors 44ma and 124 controlled thereby to return to their original condition preparatory to receiving a second stack.

The exact same operating sequence is employed to transfer a stack entering from the left in FIGURE 4 that transfers to the left, i.e. out through the top, the only difference being in the direction of roller rotation. As previously-mentioned, the rollers are reversed by switch 144 which, in one position actuates element 146 and in its second position, element 148.

A stack entering on the rollers from the right in FIGURE 4, as before, and exiting out the bottom rather than the top, requires that the system controlling the movement of follower 50ma be completely deactivated while that controlling follower 50mb be rendered operative. Switch 144 is left in the same position because the rollers are still turning in the same direction. The belts 14 do, however, have to be reversed and this is taken care of by moving switch 150 onto its other contact so as to actuate belt reversing mechanism 154 instead of 152. Mode switch 174 is moved off contact 176 and onto contact 180. In so doing, the coil of relay 178 is de-energized and the coil of relay 186 is energized in its place. The latter relay 186 performs the exact same function as relay 178 but with respect to the opposite counterparts in the system. Thus, relay 186 activates solenoid valves 164b and 206b, solenoid valve 130 being actuated in the same manner in both systems, and solenoid valves 196a and 196b being activated in both. No useful purpose would be served by detailing this alternate operational mode which is the antithesis of that already set forth in considerable detail.

Next, we will consider operation of the FIGURE 11 system in the "stop" rather than the "follower" mode. In this mode, we will consider that the stack enters the intersection on the belts 14 from the bottom of FIGURE 4 and exits on the rollers 20 to the right, i.e. make a right-hand turn. Switch 144 controlling the rollers is repositioned to energize roller-reverse mechanism 148 instead of 146 because the rollers are to turn in the direction opposite to that which was assumed in the detailed description of the follower mode. On the other hand, switch 150 stays in the same position as before, i.e. energizing belt control mechanism 152 instead of 154 because they will be going in the same direction.

Mode selector switch 174 is set on contact 184. The coil of relay 190 is energized which, in turn, closes normally-open contacts 190(1), 190(2), 190(3) and 190(4). The remaining relays controlled by the mode switch 174 are, of course, de-energized so that their normally-open contacts 178(1), 178(2), 178(3), 186(1), 186(2), 186(3), 188(1), 188(2), 188(3) and 188(4) remain open.

With contacts 178(1) and 188(1) open, solenoid valve 164a controlling servo-motor 106a is de-energized such that the high pressure entering line 132 is fed in beneath piston 108a through port 192a and line 112a to keep plate 50ma elevated up out of operative position. Air is, of course, exhausted from behind piston 108a through line 114a and port 194a. Open contact 188(2) deactivates solenoid valve 196a by circulating the air in ahead of piston 74a through line 198a and port 200a while exhausting same in line 202a and port 204a. Similarly, solenoid 206a is deactivated through open contacts 178(3) and 188(3), thus leaving the high pressure behind piston 80a by passing same through line 208a and part 210a while exhausting air in line 212a and port 214a.

Now, for the first time, piston 74b is actuated into extended position as this piston is employed exclusively for "stop" mode operation. To do so, solenoid valve 196b must be energized to put the high pressure in through line 202b and port 166b while, at the same time, exhausting same through line 198b and port 170b. Energization of solenoid valve 196b takes place through closure of normally-open contact 190(2).

To lower plate 50mb into operative position, solenoid valve 164b must be energized and this is done through closure of normally-open contact 190(1). Thus, high pressure enters the top of the servo-motor 106b through line 114b and port 168b. The exhaust air leaves the bottom of the servo-motor through line 112b and port 172b.

Solenoid valve 206b is energized through normally-open contact 190(3) that is now closed along with the normally-closed contact 162(3) of timer 162 which is not yet opened because the coil of timer 162 remains de-energized at this stage. This same normally-closed contact 162(3) energizes solenoid valve 130 through normally-open contact 190(4) that is now closed, thus dropping the rollers 20 as will be explained shortly.

When solenoid valve 206b is energized as above-mentioned, high pressure enters front chamber 68b thereof ahead of piston 80b and port 220b. Piston 80b does not, however, fully retract in chamber 68b because piston 74b is extended and a differential pressure due to the presence of piston rod 46b prevents piston 80b from overriding piston 74b. Air is exhausted from behind piston 80b through line 208b and port 222b. Note, here, that piston 80b moving from partially retracted into fully extended position functions to retract plate 50mb due to its "pusher" rather than "pulling" action (see FIGURE 8). Plate 50mb, therefore, is partially extended at this point preparatory to receiving a stack. As the stack enters the intersection on the belts 14, it actuates switch 156 into closed position as before. The coils of relays 158, 160 and 162 are energized in the same manner as was the case in the "follower" mode; however, instead of closing a circuit through 160(2) and 162(2), another circuit is completed through normally-open contact 160(3) or normally-closed contact 162(3), whichever is closed, and a closed contact or contacts in the group 188(3), 188(4), 190(3) and 190(4). When relay 160 is energized, normally-open contact 160(3) thereof closes and insures that the circuit to solenoid valve 130 through closed contact 190(4) and the circuit to solenoid valve 206b through 190(3) are maintained because, otherwise, if timer 162 actuated to open its normally-closed contact 162(3) before relay 160 could close its normally-open contact 160(3), a momentary actuation of the rollers into operative position and a momentary retraction of stop 50mb would occur. It has already been explained why relay 160 has to be energized before timer 162. Once timer 162 is, in fact, energized, its normally-closed contact 162(3) opens without breaking the circuit even momentarily.

As timer 158 times out signifying that the stack is centered on the intersection in position resting against stop 50mb, normally-closed contact 158(1) opens, de-energizing the coil of relay 160 which, in turn, reopens contact 160(3) breaking the circuit to solenoid valve 206b through previously-closed contact 190(3) as well as the circuit to solenoid valve 130 through previously-closed contact 190(4). De-energizing solenoid valve 130 reverses the flow of air to servo-motor 124 and raises the rollers 20 into operative position in accordance with a previously-described flow pattern. As for solenoid valve 206b, upon de-energization, the flow of air therethrough is reversed to move piston 80b from partially-retracted to fully-extended position thereby moving stop 50mb from its partially-extended to fully-retracted position. The flow pattern through solenoid valve 206b that accomplishes the latter movement of both piston 80b and stop 50mb connected thereto has already been explained.

Now, the stack is free to move off the intersection on the rollers 20 unhampered by stop 50mb which has been pushed away therefrom. As the stack leaves on the rollers, it allows switch 156 to reopen, de-energizing the coil of timer 162 which, as aforementioned, operates to hold its contacts in actuated condition for the time interval required for the stack to clear the intersection. As timer 162 times out, its normally-closed contact 162(3) recloses to again energize solenoid valves 206b and 130 preparatory to receiving another stack.

As was the case with the "follower" mode already described, it becomes a simple matter to transfer to the left rather than the right by merely reversing the direction of roller movement, by means of switch 144. Likewise, entering the intersection from the opposite direction, i.e. from the top in FIGURE 4, simply entails actuating plate 50ma instead of 50mb through mode switch contact 182 rather than 184.

Figure 12:
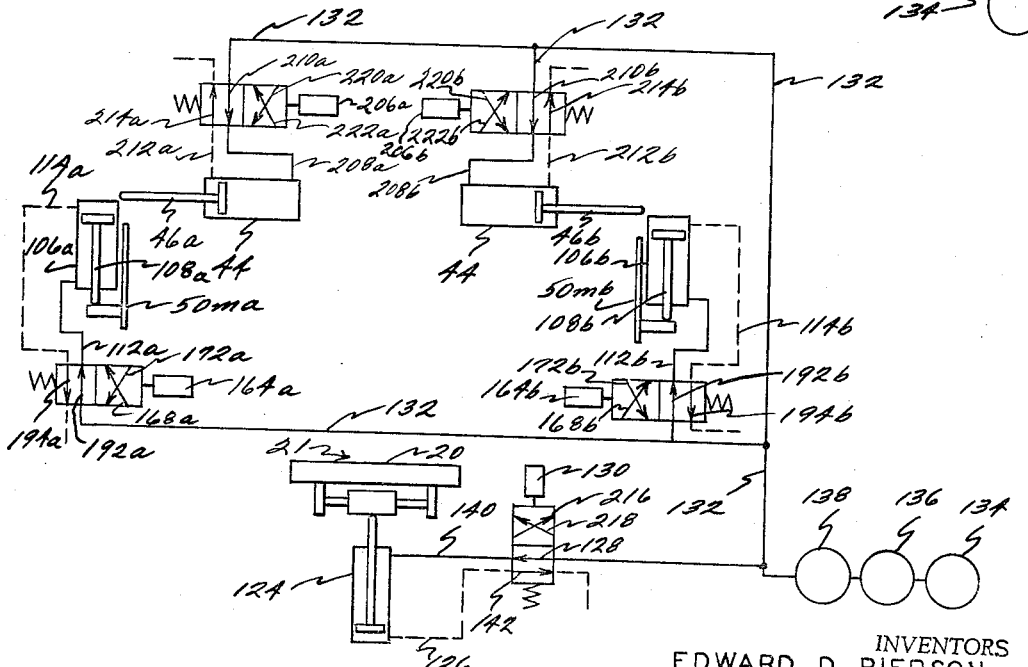
FIGURE 12 is a schematic similar to FIGURE 11 showing an "X-intersection" equipped with a simpler type of pneumatic servo-motor best suited to function as either a follower or stop but preferably not both.

Referring now to FIGURES 12 and 16, the system illustrated in FIGURE 12 is nothing more than a simplified version of the complex FIGURE 11 system wherein plates 50ma and 50mb could be utilized as either stops or followers. Here, on the other hand, both plates 50ma and 50mb can function only as followers. This means, of course, that the stacks always enter on the rollers, although they may enter the intersection from either side. The circuit of FIGURE 16 can be used to operate the system of FIGURE 12 although it would ordinarily be simplified to dispense with those components used exclusively in the "stop" mode of operation. For example, solenoid valve 196a and solenoid valve 196b that control the movement of pistons 74a and 74b can be eliminated because these pistons are no longer included in servomotors 44. Likewise, mode switch 174 need only have two contacts, namely, 176 and 180, because the remaining contacts (182 and 184) are used exclusively in the "stop" mode as are the relays 188 and 190 asociated therewith.

Conversely, it should be pointed out that while FIGURE 12 shows only a "follower" mode system, an exclusively "stop" mode system could be made by merely substituting shorter stroke servo-motors to actuate the plates 50ma and 50mb and retaining those elements of the circuit in FIGURE 16 that are functional in the "stop" mode with the exception of solenoid valves 196a and 196b which are unnecessary.

Figure 17:
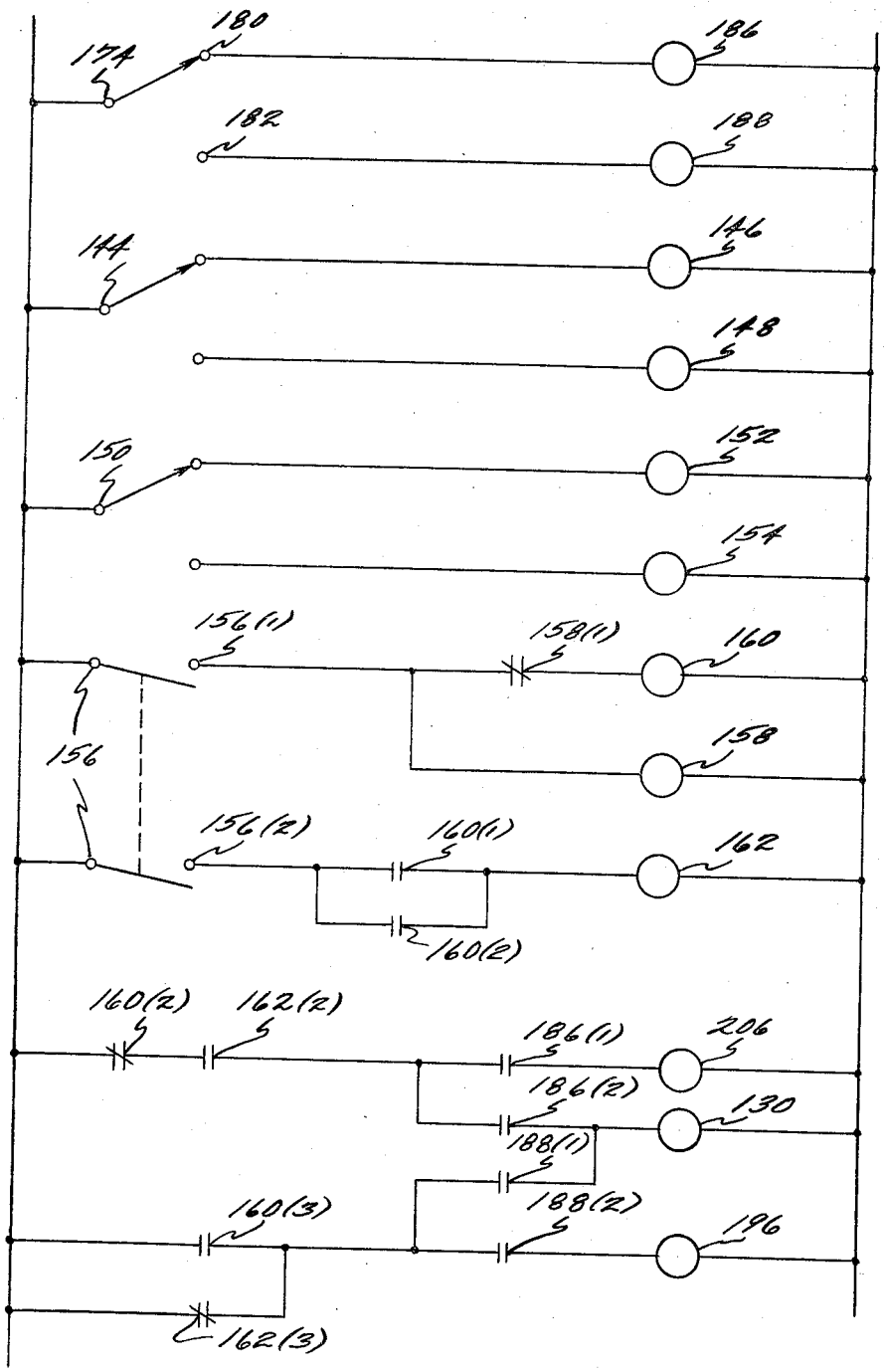
FIGURE 17 is a schematic electrical diagram showing control circuitry capable of operating any of the side-mounted units of FIGURES 13, 14 and 15.

The FIGURE 13 system used on a T-corner transfer with a side-mounted stop-follower requires a slightly different circuit than that of FIGURE 11, although the needed components are the same, just connected somewhat differently as shown in FIGURE 17 to which reference will now be made. The reason for the change is that servo-motor 44m used in both systems has to function differently in one than in the other because in the FIGURE 11 system, it pulls plate 50m in the "follower" mode and "pushes" it back out of the way in the "stop" mode; whereas, with FIGURE 13, the opposite condition exists, namely, plate 50 is "pushed" in "follower" mode and "pulled" in "stop" mode.

Mode selector switch 174 has only two positions, namely, on contact 180 or contact 182. It is shown on contact 180 which places the system of FIGURE 13 in the "follower" mode. The coil of relay 186 is energized to close normally-open contacts 186(1) and 186(2), the first of these being connected in series with solenoid valve 130, while the second is connected in series with solenoid valve 206. Conversely, the coil of relay 188 remains de-energized because of open contact 182 on the mode selector switch 174.

As soon as switch 156 closes in response to a stack moving onto the intersection on the rollers, the coils of relays 158, 160 and 162 are energized as before. When timer 158 times out, normally-closed contact 160(2) of relay 160 recloses and normally-open contact 162(2) of timer 162, which closed with actuation of switch 156, stays closed to complete the circuits to energize solenoid valves 130 and 206. When solenoid valve 130 energizes, the rollers drop down into inoperative position as previously-described while solenoid valve 206 actuates to extend piston 80 all the way forward in chamber 68, thus pushing the plate 50 along behind the "existing" stack with a "follower" action. Piston 74 remains inactive and fully-retracted. After switch 156 reopens and timer 162 times out, the elements return to their original positions.

In the "stop" mode, mode selector switch is on contact 182, thus de-energizing relay 186 which, in turn, leaves its contact 186(1) open so that piston 80 remains constantly pressurized in a direction to retract same as high pressure enters the front end of chamber 68 through line 212 and valve port 210 while exhausting through line 208 and port 214. The "ready" position of plate 50 is, however, partially-extended and this condition is brought about by energizing solenoid valve 196 to extend piston 74 in chamber 70. When piston 74 is actuated into extended position, it will partially extend piston 80 due to the differential pressure favoring piston 74.

To extend piston 74, solenoid valve 196 is energized through the normally-open contact 188(2) of relay 188 that energized with setting of the mode switch in "stop" mode and the normally-closed contact 162(3) of timer 162. The closure of normally-open contact 188(1) in the same manner actuates solenoid valve 130 to drop the rollers 20.

As the stack closes switch 156, and timer 158 times out, relay 160 de-energizes, returning normally-open contact 160(3) to open position, normally-closed contact 162(3) having already opened when switch 156 closed. Thus, the circuits to solenoid valve 196 de-energizes, high pressure enters chamber 70 ahead of piston 74 through port 200 and line 198, thus retracting the latter. Piston 80 is already constantly pressurized toward a retracted position and, when piston 74 retracts, piston 80 moves back with it to a fully-retracted position. The remainder of the operating cycle is as already set forth in detail.

Figures 14, 15:
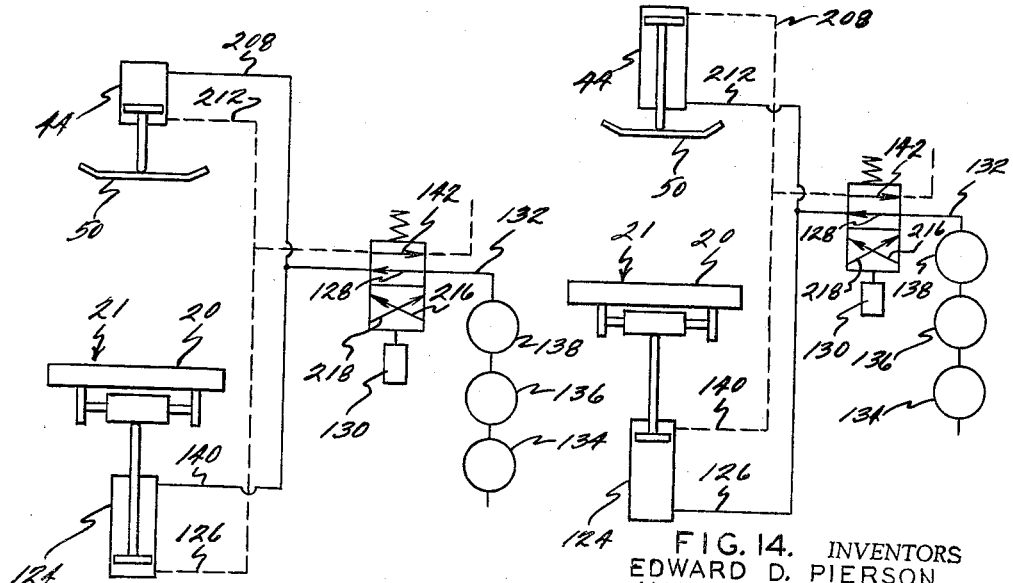
FIGURE 14 is a schematic showing a side-mounted follower on a T-corner transfer unit.
FIGURE 15 is a schematic showing a side-mounted retractable stop on a T-corner transfer unit.

The system shown in FIGURE 14 is a still further simplified version of the "T-intersection" equipped with a side-mounted follower. Having eliminated the "stop" mode, solenoid valve 196 is no longer needed and the single-chamber servo-motor 44 is used in place of double-chamber servo-motor 44m. The associated air connections are, of course, also done away with.

Actually, in the particular form illustrated in FIGURE 14, solenoid-controlled valves 196 and 206 have both been eliminated and solenoid valve 130 has been reconnected so as to operate both the roller-elevating servo-motor 124 and the follower-extending servo-motor 44. Both of these servo-motors operate simultaneously and a single solenoid-controlled valve can be employed to operate both.

As far as the control circuitry is concerned, the FIGURE 17 circuit will operate a system like that of FIGURE 14 if it includes solenoid valve 206 which controls the follower independently. As shown, the portions of the FIGURE 17 circuit which are used to actuate and deactuate solenoid valve 130 are all that are necessary as valves 196 and 206 have both been eliminated from the system.

Finally, with reference to FIGURE 15, a simple "T-intersection" equipped with a side-mounted stop has been shown. As far as the mechanical and pneumatic elements of the circuit are concerned, it is much the same as that of FIGURE 14 except that servo-motor 44 has a shorter stroke and the flow of air therethrough is reversed by switching the air connections. Here again, both solenoid valves 196 and 206 can be eliminated by employing valve 130 to control both the retractable stop and the rollers. The control circuitry would be a simplified version of that of FIGURE 17 where the mode-selection switch 174 would be permanently positioned on stop mode contact 182 and all connections to solenoid valves 196 and 206 would be eliminated.

Having thus described the several useful and novel features of our improved corner transfer units equipped with a stop-follower subassembly, it will be seen that the many worthwhile objectives for which they were devised have been achieved. While only a few specific embodiments of the invention have been specifically set forth herein, we realize that certain changes and modifications therein may well occur to those skilled in the art within the broad teaching hereof; hence, it is our intention that the scope of protection afforded hereby shall be limited only insofar as said limitations are expressly set forth in the appended claims.

What is claimed is:

1. The intersection assembly for controlling the flow of loosely-stacked articles which comprises: a corner transfer unit including belt and roller conveyors having multiple interlaced belts and rollers capable of turning articles conveyed thereon through a right angle corner, said belts defining a fixed horizontal belt conveyor surface and said rollers defining an elevatable horizontal roller conveyor surface, said roller conveyor surface being movable from an inoperative position beneath the belt conveyor surface to an operative position above the latter, belt drive means operatively connected to the belts in driving relation thereto, roller drive means operatively connected to the rollers in driving relation thereto, and two-position solenoid valve-controlled roller-elevating servo-motor means operative upon actuation and deactuation to shift said roller conveyor surface between its operative and inoperative positions; stack-alignment means positioned and adapted to engage an edge of a stack of loosely-stacked articles and maintain same essentially vertical while said stack is undergoing rapid acceleration and deceleration attendant to making a right angle change in its direction of movement within the intersection, said stack-alignment means including a vertically-disposed plate located adjacent one edge of the intersection and extending upwardly from the belt conveyor surface at substantially right angles to the direction of stack-movement thereon, and two-position solenoid valve-controlled plate-actuating servo-motor means conected to the plate and operative upon actuation to shift said plate horizontally in a direction paralleling the direction of stack-movement on the belt conveyor surface between a retracted position removed from the path of stacks moving on the roller conveyor surface and an extended position projecting into the intersection; and, stack-movement control means conected to the roller-elevating and plate-actuating servo-motor means operative to pre-set the latter in one of their two positions preparatory to a stack entering the intersection, stack-sensing means responsive to the presence of a stack within the intersection, and first and second timer means connected to the stack-sensing means and to the roller-elevating and plate-actuating means, said first timer means being operative upon actuation of the stack-sensing means to simultaneously reverse the pre-set positions of the roller-elevating and plate-actuating means when the stack reaches a centered position within the intersection, and said second timer means being responsive to deactuation of said stack-sensing means upon removal of the stack therefrom to restore said roller-elevating and plate-actuating means to their original positions after the lapse of a time interval sufficient for said stack to clear the intersection.

2. The intersection assembly as set forth in claim 1 in which: the belt drive means is turning the belts in a direction to deliver a stack entering the intersection thereon toward the plate, the roller-elevating means is pre-set to lower the roller conveyor surface, and the plate-actuating means is pre-set to extend the plate.

3. The intersection assembly as set forth in claim 1 in which: the belt drive means is turning the belts in a direction to discharge a stack leaving the intersection thereon away from the plate, the plate-elevating means is pre-set to raise the roller conveyor surface into operative position, and the plate-actuating means is pre-set to retract the plate.

4. The intersection assembly as set forth in claim 1 in which: the roller-elevating means is operative upon actuation to raise the roller conveyor surface into its operative position, and the plate-actuating means is operative upon actuation to retract the plate.

5. The intersection assembly as set forth in claim 1 in which: the roller-elevating means is operative upon actuation to lower the roller conveyor surface into its inoperative position, and the plate-actuating means is operative upon actuation to extend the plate.

6. The intersection assembly as set forth in claim 1 in which: the stack-movement control means includes mode-selection means connected to the roller-elevating and plate-actuating means, said mode-selection means having a first position operative to raise the roller conveyor surface into operative position while retracting the plate, and said mode-selection means having a second position operative to lower the roller conveyor surface while extending the plate.

7. The intersection assembly as set forth in claim 6 in which: the belt drive means is turning the belts in a direction to discharge a stack leaving the intersection thereon away from the plate, and the mode-selection means is set in its first position.

8. The intersection assembly as set forth in claim 6 in which: the belt drive means is turning the belts in a direction to deliver a stack entering the intersection thereon toward the plate, and the mode-selection means is set in its second position.

9. The intersection assembly for controlling the flow of loosely stacked articles which comprises: a corner transfer unit including belt and roller conveyors having multiple interlaced belts and rollers capable of turning articles conveyed thereon through a right angle corner, said belts defining a fixed horizontal belt conveyor surface and said rollers defining an elevatable horizontal roller conveyor surface, said roller conveyor surface being movable from an inoperative position beneath the belt conveyor surface to an operative position above the latter, belt drive means operatively connected to the belts in driving relation thereto, roller drive means operatively connected to the rollers in driving relation thereto, and two-position solenoid valve-controlled roller-elevating servo-motor means operative upon actuation and deactuation to shift said roller conveyor surface between its operative and inoperative positions; stack-alignment means positioned and adapted to engage an edge of a stack of loosely-stacked articles and maintain same essentially vertical while said stack is undergoing rapid acceleration and deceleration attendant to making a right angle change in its direction of movement within the intersection, said stack-alignment means including a vertically-disposed plate located adjacent one edge of the intersection and extending upwardly from the belt conveyor surface at substantially right angles to the direction of stack-movement thereon, and two-position solenoid valve-controlled plate-actuating servo-motor means connected to the plate and operative upon actuation to shift said plate horizontally in a direction paralleling the direction of stack-movement on the belt conveyor surface between a retracted position removed from the path of stacks moving on the roller conveyor surface and an extended position projecting into the intersection, said solenoid valve-controlled plate-actuating servo-motor means including a two-position solenoid valve-controlled plate-retracting servo-motor means and a two-position solenoid valve-controlled plate-extending servo-motor means arranged in end-to-end relation, said plate-extending means being operative upon actuation and deactuation with said plate-retracting means retracted to shift the plate between fully-retracted and fully-extended positions, and said plate-retracting means being operative upon actuation and deactuation with said plate-extending means retracted to shift said plate between its fully-retracted position and a partially-extended position; and, stack-movement control means governing the path a stack follows within the intersection in accordance with a preselected pattern, said control means including a mode-selection means connected to the roller-elevating means and one of said plate-extending and plate-retracting means, said mode-selection means being operative to lower the roller conveyor surface and partially extend the plate preparatory to a stack entering the intersection on the belt conveyor surface toward said plate, and said mode-selection means being operative to raise the roller conveyor surface and fully retract the plate preparatory to a stack entering the intersection on said roller conveyor surface, stack-sensing means responsive to the presence of a stack within the intersection, and first and second timer means connected to the stack-sensing means and whichever of the plate-extending and plate-retracting means is connected to the mode-selection means, said first timer means being operative upon actuation of the stack-sensing means by a stack entering the intersection on the belt conveyor surface to raise the roller conveyor surface and move the plate from partially-extended to fully-retracted position after said stack has impinged against said plate and it is ready to exit on said roller conveyor surface, and said first timer means being operative upon actuation of said stack-sensing means by a stack entering the intersection on the roller conveyor surface to lower the latter and move the plate from fully-retracted into fully-extended position when said stack has reached a centered position in front of said plate, and said second timer means being operative upon deactuation of the stack-sensing means upon removal of a stack therefrom to return said roller conveyor surface and plate to their original pre-set positions after the lapse of a time interval sufficient for said stack to clear the intersection.

10. The intersection assembly as set forth in claim 9 in which: actuation of the plate-extending means is operative to move the plate from fully-retracted into fully-extended position when the plate-retracting means is deactuated, actuation of the plate-retracting means is operative to move the plate from fully-retracted into partially-extended position when the plate-extending means is deactuated, deactuation of the plate-extending means is operative to shift the plate from fully-extended into fully-retracted position when the plate-retracting means is deactuated, and deactuation of the plate-retracting means is operative to move the plate from partially-extended into fully-retracted position when the plate-extending means is deactuated.

11. The intersection assembly as set forth in claim 10 in which: the mode-selection means is operative to actuate the plate-retracting means with the stack entering the intersection on the belt conveyor surface, and the first timer means is operative to deactuate said plate-retracting means.

12. The intersection assembly as set forth in claim 10 in which: the mode-selection means is operative to deactuate the plate-extending means with the stack entering the intersection on the roller conveyor surface, and the first timer means is operative to actuate said plate-extending means.

13. The intersection assembly for controlling the flow of loosely-stacked articles which comprises: a corner transfer unit including belt and roller conveyors having multiple interlaced belts and rollers capable of turning articles conveyed thereon through a right angle corner, said belts defining a fixed horizontal belt conveyor surface and said rollers defining an elevatable horizontal roller conveyor surface, said roller conveyor surface being movable from an inoperative position beneath the belt conveyor surface to an operative position above the latter, belt drive means operatively connected to the belts in driving relation thereto, roller drive means operatively connected to the rollers in driving relation thereto, and two-position solenoid valve-controlled roller-elevating servo-motor means operative upon actuation and deactuation to shift said roller conveyor surface between its operative and inoperative positions; stack-alignment means positioned and adapted to engage an edge of a stack of loosely-stacked articles and maintain same essentially verticle while said stack is undergoing rapid acceleration and deceleration attendant to making a right angle change in its direction of movement within the intersection, said stack-alignment means including a vertically-disposed plate located adjacent one edge of the intersection and extending upwardly from the belt conveyor surface at substantially right angles to the direction of stack movement thereon, and two-position solenoid valve-controlled plate-actuating servo-motor means connected to the plate and operative upon actuation and deactuation to shift said plate horizontally in a direction paralleling the direction of stack movement on the belt conveyor surface between a retracted position removed from the path of stacks moving on the roller conveyor surface and an extended position projecting into the intersection; overhead-mounted plate-elevating means connected to said plate and operative upon actuation to raise same out of the path of a stack leaving the intersection therebeneath on the belt conveyor surface, said plate-elevating means including vertically-disposed two-position solenoid valve-controlled plate-elevating servo-motor means connected to the plate and operative upon actuation and deactuation to shift said plate between a raised inoperative position and a lowered operative position; and, stack-movement control means governing the path a stack follows through the intersection in accordance with a preselected pattern, said control means including mode-selection means selectively connectable to said plate-elevating means and to said roller-elevating and plate-actuating means, said mode-selection means being operative in one position to lower the roller conveyor surface into inoperative position and raise the plate into inoperative position while deactivating the plate-actuating means so as to clear the intersection for a stack to pass straight through on the belts, said mode-selection means being operative in a second position to lower and extend the plate while lowering the roller conveyor surface into inoperative position preparatory to receiving a stack entering on the belt conveyor surface for discharge on said roller conveyor surface, and said mode-selection means having a third position in which it is operative to lower and extend the plate while raising the roller conveyor surface into operative position preparatory to receiving a stack on the latter for discharge on the belt conveyor surface, stack-sensing means responsive to the presence of a stack within the intersection, and first and second timer means connected to the stack-sensing means and to the roller-elevating means and plate-actuating means when the mode-selection means is set in its second and third positions, said first timer means being operative upon actuation of the stack-sensing means when the mode-selection means is set in its second position to retract the plate and raise the roller conveyor surface into operative position after the stack has impinged thereagainst and it is ready to exit on said roller conveyor surface, and said first timer means being operative upon actuation of said stack-sensing means with the mode-selection means set in its third position to extend the plate and lower the roller conveyor surface into inoperative position when the stack has reached a position within the intersection centered in front of said plate, and said second timer means being operative upon deactuation of the stack-sensing means upon removal of a stack therefrom with the mode-selection means set in either its second or third position to return the roller conveyor surface and plate to their original pre-set positions after the lapse of a time interval sufficient for said stack to clear the intersection.

14. The intersection assembly as set forth in claim 13 in which: the plate-elevating means is operative upon actuation to lower the plate into operative position and upon deactuation to raise same into inoperative position.

15. The intersection assembly as set forth in claim 13 in which: the belt drive means is turning the belts in a direction to deliver a stack entering the intersection thereon toward the plate, and the mode-selection means is set in its first position.

16. The intersection assembly as set forth in claim 13 in which: the belt drive means is turning the belts in a direction to deliver a stack entering the intersection thereon toward the plate, and the mode-selection means is set in its second position.

17. The intersection assembly as set forth in claim 13 in which: the belt drive means is turning the belts in a direction to discharge a stack leaving the intersection thereon away from the plate, and the mode-selection means is set in its third position.

18. The intersection assembly as set forth in claim 14 in which: the roller-elevating means is operative upon actuation to raise the roller conveyor surface into its operative position, and the plate-actuating means is operative upon actuation to retract the plate.

19. The intersection assembly as set forth in claim 14 in which: the roller-elevating means is operative upon actuation to lower the roller conveyor surface into its inoperative position, and the plate-actuating means is operative upon actuation to extend the plate.

20. The intersection assembly for controlling the flow of loosely-stacked articles which comprises: a corner transfer unit including belt and roller conveyors having multiple interlaced belts and rollers capable of turning articles conveyed thereon through a right angle corner, said belts defining a fixed horizontal belt conveyor surface and said rollers defining an elevatable horizontal roller conveyor surface, said roller conveyor surface being movable from an inoperative position beneath the belt conveyor surface to an operative position above the latter, belt drive means operatively connected to the belts in driving relation thereto, roller drive means operatively connected to the rollers in driving relation thereto, and two-position solenoid valve-controlled roller-elevating servo-motor means operative upon actuation and deactuation to shift said roller conveyor surface between its operative and inoperative positions; stack-alignment means positioned and adapted to engage an edge of a stack of loosely-stacked articles and maintain same essentially vertical while said stack is undergoing rapid acceleration and deceleration attendant to making a right angle change in its direction of movement within the intersection, said stack-alignment means including first and second vertically-disposed plates located adjacent opposite edges of the intersection extending upwardly from the belt conveyor surface at substantially right angles to the direction of stack movement thereon and in spaced parallel relation to one another, and first and second two-position solenoid valve-controlled plate-actuating servo-motor means connected respectively to the first and second plates, said first and second plate-actuating means being independently operative upon actuation and deactuation to shift their respective plates horizontally in a direction paralleling the direction of stack movement on the belt conveyor surface between a retracted position removed from the path of stacks moving on the roller conveyor surface and an extended position projecting into the intersection; plate-elevating means for shifting said plates independently of one another between a lowered operative position in the path of a stack moving toward same on the belt conveyor surface and a raised inoperative position adapted to let a stack pass therebeneath, said plate-elevating means including overhead-mounted first and second two-position solenoid valve-controlled plate-elevating servo-motor means connected respectively to the first and second plates, said first and second plate-elevating means being independently operative upon actuation and deactuation to shift their respective plates between their operative and inoperative positions; and, stack-movement control means governing the path a stack follows through the intersection, said control means including mode-selection means being selectively connectable to the roller elevating means and to the first and second plate-actuating and plate-elevating means, said mode-selection means having at least two positions in which the plate that would block entry of a stack into the intersection on the belt conveyor surface is raised into inoperative position and the other of said plates is lowered into operative position, the first of these two positions being one in which the mode-selection means is operative to lower the roller conveyor surface and extend the plate lowered into operative position, and said mode-selection means being operative in the second of said two positions to raise the roller conveyor surface and retract the plate lowered into operative position, stack-sensing means responsive to the presence of a stack within the intersection, and first and second timer means connected to the stack-sensing means and the roller-elevating means along with the plate-actuating means of the plate lowered into operative position when the mode-selection means is set in its first and second positions, said first timer means being responsive to actuation of the stack-sensing means with the mode-selection means set in its first position to raise the roller conveyor surface and retract the plate lowered into operative position after a stack has impinged thereagainst and is ready to exit on said roller conveyor surface, and said first timer means responsive to actuation of said stack-sensing means with the mode-selection means set in its second position to lower the roller conveyor surface and extend the plate lowered into operative position when a stack reaches a centered position on the intersection in front of said plate, and said second timer means being operative upon deactuation of said stack-sensing means upon removal of a stack therefrom with said mode-selection means set in either of said two positions to return the roller conveyor surface and plate lowered into operative position to their original pre-set positions following the lapse of a time interval sufficient for a stack to clear the intersection.

21. The intersection assembly as set forth in claim 20 in which: the belt drive means is turning the belts in a direction to move a stack thereon toward the first plate, the first plate-elevating means is operative to lower the first plate, the second plate-elevating means is operative to raise the second plate, and the mode-selection means is set in its first position.

22. The intersection assembly as set forth in claim 20 in which: the belt drive means is turning the belts in a direction to move a stack thereon toward the second plate, the second plate-elevating means is operative to lower the second plate, the first plate-elevating means is operative to raise the first plate, and the mode-selection means is set in its first position.

23. The intersection assembly as set forth in claim 20 in which: the belt drive means is turning the belts in a direction to carry a stack thereon away from the second plate, the first plate-elevating means is operative to raise the first plate into inoperative position, the second plate-elevating means is operative to lower the second plate into operative position, and the mode-selection means is set in its second position.

24. The intersection assembly as set forth in claim 20 in which: the belt drive means is turning the belts in a direction to carry a stack thereon away from the first plate, the second plate-elevating means is operative to raise the second plate into inoperative position, the first plate-elevating means is operative to lower the first plate into operative position, and the mode-selection means is set in its second position.

25. The intersection assembly as set forth in claim 20 in which: the mode-selection means includes a third position connected to the roller-elevating means and operative to raise the roller conveyor surface for a stack to pass straight through the intersection thereon.

26. The intersection assembly as set forth in claim 20 in which: the mode-selection means includes a fourth position connected to the roller-elevating means and to both the first and second plate-elevating means, said mode-selection means being operative in said fourth position to raise both the first and second plates into inoperative position while lowering the roller conveyor surface into inoperative position so as to permit a stack to pass straight through the intersection on the belt conveyor surface.

27. The intersection assembly for controlling the flow of loosely-stacked articles which comprises: a corner transfer unit including belt and roller conveyors having multiple interlaced belts and rollers capable of turning articles conveyed thereon through a right angle corner, said belts defining a fixed horizontal belt conveyor surface and said rollers defining an elevatable horizontal roller conveyor surface, said roller conveyor surface being movable from an inoperative position beneath the belt conveyor surface to an operative position above the latter, belt drive means operatively connected to the belts in driving relation thereto, roller drive means operatively connected to the rollers in driving relation thereto, and two-position solenoid valve-controlled roller-elevating servo-motor means operative upon actuation and deactuation to shift said roller conveyor surface between its inoperative and operative positions; stack-alignment means positioned and adapted to engage an edge of a stack of loosely-stacked articles and maintain same essentially vertical while said stack is undergoing rapid acceleration and deceleration attendant to making a right angle change in its direction of movement within the intersection, said stack-alignment means including first and second vertically-disposed plates located adjacent opposite edges of the intersection extending upwardly from the belt conveyor surface at substantially right angles to the direction of stack movement thereon and in spaced parallel relation to one another, first and second two-position solenoid valve-controlled plate-extending servo-motor means connected respectively to the first and second plates, and first and second two-position solenoid valve-controlled plate-retracting servo-motor means connected respectively to the first and second plate-extending means in end-to-end relation, each of said plate-retracting and plate-extending subassemblies being independently operative upon actuation and deactuation of said plate-extending means with said plate-retracting means retracted to shift the plate connected thereto between a fully-retracted position removed from the path of a stack moving on the roller conveyor surface and a fully-extended position projecting into the intersection, and each of said plate-retracting and plate-extending subassemblies being independently operative upon actuation and deactuation of said plate-retracting means with said plate-extending means retracted to shift the plate connected thereto between a partially-extended position and a fully-retracted position; plate-elevating means for shifting said plates independently of one another between a lowered operative position in the path of a stack moving toward same on the belt conveyor surface and a raised inoperative position adapted to let a stack pass therebeneath, said plate-elevating means including overhead-mounted first and second two-position solenoid valve-controlled plate-elevating servo-motor means connected respectively to the first and second plates, said first and second plate-elevating means being independently operative upon actuation and deactuation to shift their respective plates between operative and inoperative positions; and, stack-movement control means governing the path a stack follows through the intersection, said control means including multi-position mode-selection means selectively connected to at least one of said servo-motor means in each of its positions and operative when so connected to prepare said intersection to receive a stack, said mode-selection means having at least two positions, the first of said two positions being one in which said mode-selection means is operative to lower the roller conveyor surface into inoperative position, lower the plate into operative position that lies in the path of a stack moving toward same on the belt conveyor surface while raising the other of said plates into inoperative position, and partially-extending said plate lowered into operative position, and said mode-selection means in the second of said two positions being operative to raise the roller conveyor surface into operative position, lower the plate into operative position that lies behind a stack moving away therefrom on the belt conveyor surface while raising the other of said plates into inoperative position, and fully-retracting said plate lowered into operative position, stack-sensing means responsive to the presence of a stack within the intersection, and first and second timer means connected to the stack-sensing means and to the roller-elevating means and plate-actuating means of the plate in operative position when said mode-selection means is set in either of said two positions; said first timer means being responsive to actuation of said stack-sensing means with said mode-selection means set in its first position to shift the lowered plate into fully-retracted position after a stack has impinged thereagainst and raise the roller conveyor surface into operative position to discharge said stack thereon, and said first timer means being responsive to actuation of said stack-sensing means with said mode-selection means set in the second of said two positions to shift the lowered plate into fully-extended position after a stack reaches a centered position on the intersection in front thereof and lower the roller conveyor surface into inoperative position to discharge said stack on the belt conveyor surface, and said second timer means being responsive to deactuation of said stack-sensing means upon removal of a stack therefrom with said mode-selection means set in either of said two positions to return said lowered plate and roller conveyor surface to their original pre-set positions after the lapse of a time interval sufficient for said stack to clear the intersection.

28. The intersection assembly as set forth in claim 27 in which: said mode-selection means includes a third position operative to raise the roller conveyor surface into operative position enabling a stack to pass straight through the intersection thereon.

29. The intersection assembly as set forth in claim 27 in which: the mode-selection means includes a fourth position operative to lower the roller conveyor surface and raise both plates into inoperative position enabling a stack to pass straight through the intersection on the belt conveyor surface.

30. The intersection assembly as set forth in claim 27 in which: the mode-selection means is set in its first position, the belt drive means is turning the belts in a direction to deliver a stack thereon toward the first plate, and said first plate is lowered into operative position.

31. The intersection assembly as set forth in claim 27 in which: the mode-selection means is set in its first position, the belt drive means is turning the belts in a direction to deliver a stack thereon toward the second plate, and said second plate is lowered into operative position.

32. The intersection assembly as set forth in claim 27 in which: the mode-selection means is set in its second position, the belt drive means is turning the belts in a direction to discharge a stack thereon away from the first plate, and said first plate is lowered into operative position.

33. The intersection assembly as set forth in claim 27 in which: the mode-selection means is set in its second position, the belt drive means is turning the belt in a direction to discharge a stack thereon away from the second plate, and said second plate is lowered into operative position.

34. The intersection assembly as set forth in claim 27 in which the first and second plate-extending means are operative upon movement from extended to retracted position to move their respective plates from retracted into extended position.

35. The intersection assembly as set forth in claim 27 in which: the first and second plate-retracting means are operative upon movement from extended to retracted position to move the plate-extending means associated therewith from partially-extended into fully-retracted position and to move the plates connected to the latter from fully-retracted into partially-extended position.

References Cited

UNITED STATES PATENTS

| | | | |
|---|---|---|---|
| 3,134,476 | 5/1964 | Pierson | 198—103 |
| 3,370,848 | 2/1968 | Bartlett | 271—89 |
| 3,385,457 | 5/1968 | Zinn | 271—89 |

RICHARD E. AEGERTER, Primary Examiner

U.S. Cl. X.R.

198—103